US012809220B1

(12) United States Patent
Klein et al.

(10) Patent No.: US 12,809,220 B1
(45) Date of Patent: Nov. 24, 2026

(54) CHEMOCHROMIC NANOPARTICLES WITH REDOX-LABILE DOPANTS

(71) Applicant: HRL Laboratories, LLC, Malibu, CA (US)

(72) Inventors: Shirell Klein, Los Angeles, CA (US); Adam Gross, Santa Monica, CA (US); Jason Lipton, Los Angeles, CA (US); John Vajo, West Hills, CA (US); Erik Crenshaw, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 415 days.

(21) Appl. No.: 18/527,947

(22) Filed: Dec. 4, 2023

Related U.S. Application Data

(63) Continuation-in-part of application No. 18/197,057, filed on May 13, 2023, and a continuation-in-part of (Continued)

(51) Int. Cl.

| | |
|---|---|
| ***G02F 1/1514*** | (2019.01) |
| ***G02F 1/1503*** | (2019.01) |
| *B82Y 20/00* | (2011.01) |
| *B82Y 40/00* | (2011.01) |
| *C09K 9/00* | (2006.01) |
| *G02F 1/01* | (2006.01) |

(52) U.S. Cl.
CPC .......... *G02F 1/1514* (2019.01); *G02F 1/1503* (2019.01); *B82Y 20/00* (2013.01); *B82Y 40/00* (2013.01); *C09K 9/00* (2013.01); *G02F 1/0121* (2013.01)

(58) Field of Classification Search
USPC ................................................. 359/244, 265
See application file for complete search history.

(56) References Cited

U.S. PATENT DOCUMENTS

| | | | | |
|---|---|---|---|---|
| 12,509,624 | B1 * | 12/2025 | Klein ........................ | C09K 9/00 |
| 2019/0339239 | A1 | 11/2019 | Noh et al. | |
| 2022/0162085 | A1 | 5/2022 | Kobayashi et al. | |

FOREIGN PATENT DOCUMENTS

| | | | |
|---|---|---|---|
| WO | 2020175245 | A1 | 9/2020 |

OTHER PUBLICATIONS

Han et al., "Fast T-Type Photochromism of Colloidal Cu-Doped ZnS Nanocrystals", J. Am. Chem. Soc. 2021, 143, 2239-2249 with Supporting Information.

(Continued)

*Primary Examiner* — Dung T Nguyen
(74) *Attorney, Agent, or Firm* — O'Connor & Company; Ryan P. O'Connor

(57) ABSTRACT

Some variations provide a chemochromic article comprising: semiconductor nanoparticles that have an average nanoparticle effective diameter from 1 nanometer to 20 nanometers; transition-metal dopant particles disposed on surfaces of the semiconductor nanoparticles and/or within the semiconductor nanoparticles, wherein the transition-metal dopant particles are capable of undergoing reversible oxidation and reduction, and wherein the transition-metal dopant particles are present in an amount from about 0.001% to about 5% of the weight of the semiconductor nanoparticles; a redox agent that is capable of changing an oxidation state of the transition-metal dopant particles; ligands bonded to the semiconductor nanoparticles, wherein the ligands contain a carboxylate functional group, a thiol functional group, an amine functional group, or a combination thereof; and optionally, a matrix surrounding the semiconductor nanoparticles or surrounding a solution containing the semiconductor nanoparticles. Some embodiments provide an electrochemical cell for controlling a chemochromic assembly. Examples demonstrate embodiments of the invention.

22 Claims, 7 Drawing Sheets

Related U.S. Application Data application No. 18/197,058, filed on May 13, 2023, and a continuation-in-part of application No. 18/197,061, filed on May 13, 2023, now Pat. No. 12,590,243, and a continuation-in-part of application No. 18/197,060, filed on May 13, 2023.

(60) Provisional application No. 63/390,634, filed on Jul. 20, 2022.

(56) References Cited

OTHER PUBLICATIONS

Sanada et al., "Origin of the Anomalous Temperature Dependence of the Photochromic Reaction of Cu-Doped ZnS Nanocrystals", J. Phys. Chem. Lett. 2021, 12, 8129-8133.

Ma et al., "Enhancement of Afterglow in ZnS:Cu, Co Water-Soluble Nanoparticles by Aging", J. Phys. Chem. C 2011, 115, 8940-8944.

Ding et al., "Efficiency of Hole Transfer from Photoexcited Quantum Dots to Covalently Linked Molecular Species", J. Am. Chem. Soc.2015, 137, 2021-2029.

Olshansky et al., "Hole Transfer from Photoexcited Quantum Dots: The Relationship between Driving Force and Rate", J. Am. Chem. Soc. 2015, 137, 15567-15575.

Jiang et al., "Aqueous synthesis of color tunable Cu doped Zn—In—S/ZnS nanoparticles in the whole visible region for cellular imaging", J. Mater. Chem. B, 2015,3, 2402-2410.

Joost et al., "Reversible Photodoping of TiO2 Nanoparticles for Photochromic Applications", Chem. Mater. 2018, 30, 8968-8974.

Wang et al., "Reversible Chemochromic MoO3 Nanoribbons through Zerovalent Metal Intercalation", ACS Nano 2015, 9(3), 3226-3233.

Peng et al., "Synthesis and photoluminescence of ZnS:Cu nanoparticles", Optical Materials, vol. 29, Issues 2-3, Nov. 2006, pp. 313-317.

Ito et al., "Photochromism of colloidal ZnO nanocrystal powders under ambient conditions", Photochemical & Photobiological Sciences (2022) 21:1781-1791.

* cited by examiner

CHEMOCHROMIC NANOPARTICLES WITH REDOX-LABILE DOPANTS

PRIORITY DATA

This patent application is a continuation-in-part application of each of U.S. patent application Ser. No. 18/197,057, filed on May 13, 2023; U.S. patent application Ser. No. 18/197,058, filed on May 13, 2023; U.S. patent application Ser. No. 18/197,060, filed on May 13, 2023; and U.S. patent application Ser. No. 18/197,061, filed on May 13, 2023, each of which is hereby incorporated by reference. Each of the four cited parent applications claim priority to U.S. Provisional Patent App. No. 63/390,634, filed on Jul. 20, 2022, which is hereby incorporated by reference herein.

FIELD OF THE INVENTION

The present invention generally relates to chemochromic compositions, chemochromic systems, and methods of making and using chemochromic compositions and chemochromic systems.

BACKGROUND OF THE INVENTION

Chemochromism is a reversible chemical transformation of a chemical species between two forms having different absorption spectra. During the chemical transformation, there may be various changes in physicochemical properties, such as oxidation/reduction state, chemical structure, refractive index, and dielectric constant.

There are many uses for chemochromic materials, in which the materials are colored (or darkened) when chemically transformed, the color disappears when a reverse chemical transformation takes place, and the color change is repeated potentially many times. Chemochromic materials may be utilized in lenses, windows, and sensors, such as for autonomous vehicles, for example.

Existing chemochromics are made from organic molecules, complexes, or metal ions that undergo redox of the entire material to initiate a color change. This requires significant chemical input to switch absorption from one state to another, and lacks tunability which therefore limits the applications. Existing chemochromics also require an entirely new molecule, complex, or ion to be created in order to tune the absorbed wavelengths.

Another shortcoming with conventional chemochromic materials is that they are not active outside of a set wavelength range that is based on the composition. There is a desire for chemochromic materials and systems that enable a greater range of operable wavelengths, such as ultraviolet (UV), visible, near infrared (NIR), mid-wave (MWIR), and long-wave infrared (LWIR) electromagnetic wavelengths. Infrared and visible wavelengths are important for many types of sensors, such as sensors for autonomous vehicles, imaging devices, optical power meters, missile guidance, flame monitors, moisture analyzers, night-vision devices, rail safety, water intrusion, and many other commercial applications. No visible-through-LWIR, tunable optical protection system exists today without the requirement to switch the redox or ordering of the entire molecule.

Improved chemochromic materials and systems are needed commercially. There is a desire for chemochromic materials and systems that reduce the energy requirements, compared to current chemochromics and electrochromics, for example.

SUMMARY OF THE INVENTION

The present invention addresses the aforementioned needs in the art, as will now be summarized and then further described in detail below.

Some variations provide a chemochromic article comprising:

(a) semiconductor nanoparticles that have an average nanoparticle effective diameter from about 1 nanometer to about 20 nanometers;

(b) transition-metal dopant particles disposed on surfaces of the semiconductor nanoparticles and/or within the semiconductor nanoparticles, wherein the transition-metal dopant particles are capable of undergoing reversible oxidation and reduction, and wherein the transition-metal dopant particles are present in an amount from about 0.001% to about 5% of the weight of the semiconductor nanoparticles;

(c) a redox agent that is capable of changing an oxidation state of the transition-metal dopant particles;

(d) ligands bonded to the semiconductor nanoparticles, wherein the ligands contain a carboxylate functional group, a thiol functional group, an amine functional group, or a combination thereof; and (e) optionally, a matrix surrounding the semiconductor nanoparticles or surrounding a solution containing the semiconductor nanoparticles.

In some embodiments, the semiconductor nanoparticles are selected from the group consisting of single-element nanoparticles, two-element nanoparticles, three-element nanoparticles, four-element nanoparticles, and combinations thereof.

In certain embodiments, single-element nanoparticles are selected from the group consisting of Si, Ge, and combinations thereof.

In certain embodiments, two-element nanoparticles are selected from the group consisting of ZnS, ZnSe, ZnTe, CdS, CdSe, CdTe, PbS, PbSe, PbTe, InP, InAs, InSb, GaP, GaAs, $Ag_2S$, $Ag_2Se$, $Ag_2Te$, and combinations thereof.

In certain embodiments, the three-element nanoparticles are selected from the group consisting of $Zn_xCd_{1-x}S$, $Zn_xCd_{1-x}Se$, $Zn_xCd_{1-x}Te$, $Zn_xPb_{1-x}S$, $ZnPb_{1-x}Se$, $Zn_xPb_{1-x}Te$, $Zn_xSn_{1-x}S$, $Zn_xSn_{1-x}Se$, $Zn_xSn_{1-x}Te$, $Pb_xSn_{1-x}S$, $Pb_xSn_{1-x}Se$, $Pb_xSn_{1-x}Te$, $In_xGa_{1-x}P$, $In_xGa_{1-x}As$, $Ag_{2x}Cd_{1-x}S$, $Ag_{2x}Cd_{1-x}Se$, $Ag_{2x}Cd_{1-x}Te$, $Ag_{2x}Pb_{1-x}S$, $Ag_{2x}Pb_{1-x}Se$, $Ag_{2x}Pb_{1-x}Te$, $Ag_{2x}Sn_{1-x}S$, $Ag_{2x}Sn_{1-x}Se$, $Ag_{2x}Sn_{1-x}Te$, and combinations thereof, wherein $0<x<1$.

In certain embodiments, four-element nanoparticles are selected from the group consisting of copper indium gallium selenide, copper zinc tin sulfide, and combinations thereof.

In some embodiments, the transition-metal dopant particles contain a transition metal selected from the group consisting of Cu, Fe, Ag, Eu, and combinations thereof. The transition metal may be in any oxidation state, and during reversible oxidation and reduction, is in at least two different oxidation states.

In some embodiments, the transition-metal dopant particles are incorporated into a crystal lattice of the semiconductor nanoparticles. In other embodiments, the transition-metal dopant particles are incorporated on surfaces of the semiconductor nanoparticles. In certain embodiments, the transition-metal dopant particles are both incorporated into a crystal lattice of, as well as incorporated on surfaces of, the semiconductor nanoparticles.

In some embodiments, the transition-metal dopant particles are present in an amount from about 0.1% to about 2% of the weight of the semiconductor nanoparticles.

In some embodiments, the redox agent is selected from the group consisting of $NaIO_3$, $KIO_3$, $[Fe(CN)_6]^{3-}$, p-benzoquinone, $Na_2S_2O_3$, $K_2S_2O_3$, $NaBH_4$, $LiAlH_4$, diisobutylaluminum hydride, benzoyl peroxide, dicumyl peroxide, $I_2$, $I_3^-$, and combinations thereof.

In some embodiments, the matrix is an organic matrix. In other embodiments, the matrix is an inorganic matrix. In certain embodiments, the matrix is a hybrid organic-inorganic matrix.

In some embodiments, the ligands contain a carboxylate functional group, and the ligands are selected from the group consisting of 4-pentenoate, phenylacetate, 3-phenylpropionate, 4-phenylbutyrate, methacrylate, oleate, and combinations thereof.

In some embodiments, the ligands contain a thiol functional group, and the ligands are selected from the group consisting of 2-propene-1-thiol, benzenethiol, and combinations thereof.

In some embodiments, the ligands contain an amine functional group, and the ligands are selected from the group consisting of porphyrins, aniline, benzylamine, phenethylamine, phenylpropylamine, oleylamine, 2-aminoethanol, 3-aminopropanol, and combinations thereof.

In some embodiments, the chemochromic article further comprises an ionic charge-compensating species contained within the semiconductor nanoparticles and/or contained on surfaces of the semiconductor nanoparticles.

When present, the ionic charge-compensating species may be selected from the group consisting of $Li^+$, $Na^+$, $K^+$, $Mg^{2+}$, $H^+$, and combinations thereof.

In some embodiments, the chemochromic article is contained within an electrochemical cell.

Some variations of the invention provide an electrochemical cell for controlling a chemochromic assembly, the electrochemical cell comprising:

(A) a chemochromic assembly comprising:

semiconductor nanoparticles that have an average nanoparticle effective diameter from about 1 nanometer to about 20 nanometers;

transition-metal dopant particles disposed on surfaces of the semiconductor nanoparticles and/or within the semiconductor nanoparticles, wherein the transition-metal dopant particles are capable of undergoing reversible oxidation and reduction, and wherein the transition-metal dopant particles are present in an amount from about 0.001% to about 5% of the weight of the semiconductor nanoparticles;

ligands bonded to the semiconductor nanoparticles, wherein the ligands contain a carboxylate functional group, a thiol functional group, an amine functional group, or a combination thereof; and optionally, a matrix surrounding the semiconductor nanoparticles or surrounding a solution containing the semiconductor nanoparticles;

(B) one or more redox-labile species that are capable of changing an oxidation state of the transition-metal dopant particles;

(C) a positive electrode;

(D) a negative electrode; and (E) an electrolyte.

In some embodiments of an electrochemical cell, the transition-metal dopant particles contain a transition metal selected from the group consisting of Cu, Fe, Ag, Eu, and combinations thereof. The transition metal may be in any oxidation state, and during reversible oxidation and reduction, is in at least two different oxidation states.

In some embodiments of an electrochemical cell, the transition-metal dopant particles are present in an amount from about 0.1% to about 2% of the weight of the semiconductor nanoparticles.

In some embodiments of an electrochemical cell, the redox-labile species is selected from the group consisting of $NaIO_3$, $KIO_3$, $[Fe(CN)_6]^{3-}$, p-benzoquinone, $Na_2S_2O_3$, $K_2S_2O_3$, $NaBH_4$, $LiAlH_4$, diisobutylaluminum hydride, benzoyl peroxide, dicumyl peroxide, $I_2$, $I_3^-$, and combinations thereof.

In some embodiments of an electrochemical cell, the semiconductor nanoparticles are attached to the positive electrode, to the negative electrode, or to both the positive and negative electrodes.

In some embodiments of an electrochemical cell, the semiconductor nanoparticles are mixed with an electrode-binding agent selected from the group consisting of PVDF, CMC, PTFE, and combinations thereof.

In some embodiments of an electrochemical cell, the semiconductor nanoparticles are dissolved in the electrolyte.

In some embodiments of an electrochemical cell, the positive electrode and the negative electrode each contain an electrode material independently selected from the group consisting of platinum, gold, glassy carbon, graphite, stainless steel, tungsten, fluorinated tin oxide, indium tin oxide, and combinations thereof. A conductive additive, such as carbon black, may be added to the positive electrode and/or the negative electrode.

In some embodiments of an electrochemical cell, the electrolyte is selected from the group consisting of $LiSO_4$, $Na_2SO_4$, $KSO_4$, $LiCO_3$, KCl, $LiClO_4$, $KNO_3$, $LiPF_6$, and combinations thereof.

In some embodiments of an electrochemical cell, the electrochemical cell further includes an electrolyte solvent selected from the group consisting of water, dimethylformamide, dimethylsulfoxide, dimethyl carbonate, diethyl carbonate, propylene carbonate, ethylene carbonate, γ-butyrolactone, acetone, ethers, toluene, tetrahydrofuran, acetonitrile, and combinations thereof.

Other variations provide a method to control a chemochromic article, the method comprising:

(i) providing a chemochromic assembly comprising:

semiconductor nanoparticles that have an average nanoparticle effective diameter from about 1 nanometer to about 20 nanometers;

transition-metal dopant particles disposed on surfaces of the semiconductor nanoparticles and/or within the semiconductor nanoparticles, wherein the transition-metal dopant particles are capable of undergoing reversible oxidation and reduction, and wherein the transition-metal dopant particles are present in an amount from about 0.001% to about 5% of the weight of the semiconductor nanoparticles;

ligands bonded to the semiconductor nanoparticles, wherein the ligands contain a carboxylate functional group, a thiol functional group, an amine functional group, or a combination thereof; and optionally, a matrix surrounding the semiconductor nanoparticles or surrounding a solution containing the semiconductor nanoparticles;

(ii) exposing the chemochromic assembly to a first redox agent to change the oxidation state of the transition-metal dopant particles, wherein step (ii) does not change the oxidation state of any elements in the semiconductor nanoparticles;

(iii) optionally, exposing the chemochromic assembly to a second redox agent to change the oxidation state of the transition-metal dopant particles back to the original oxidation state prior to step (ii), wherein step (iii) does not change the oxidation state of any elements in the semiconductor nanoparticles.

DETAILED DESCRIPTION OF EMBODIMENTS OF THE INVENTION

Figure 1:
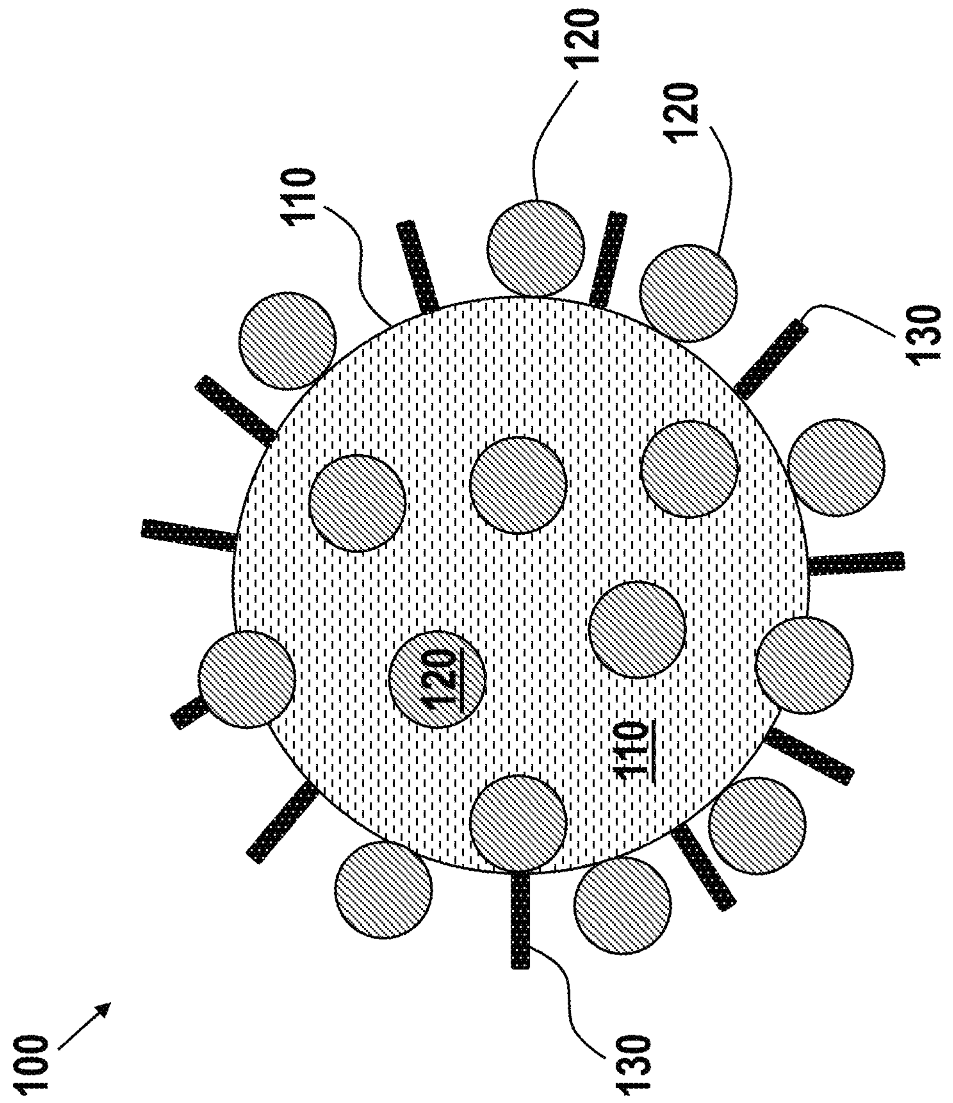
FIG. 1 depicts an exemplary chemochromic doped nanoparticle, in various embodiments.

The principles, structures, compositions, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

The present invention provides nanoparticles with transition-metal dopants, wherein the doped nanoparticles darken in response to a chemical oxidant or reductant, thereby modifying the oxidation state of the dopant to reversibly create an optically absorbing midgap electronic state. The absorption is caused by the midgap dopant state in the nanoparticle. The redox state of the dopant changes and the orbital becomes partially occupied, which allows new electronic transitions. The redox agent turns off and on the photochromic ability, while the dopant midgap orbital energy controls the tinting wavelengths. After the dopant orbital is oxidized, the partially filled state is optically absorbing at wavelengths determined by the transition-metal dopant. The absorbed wavelengths from the midgap electronic state can be tuned by changing the semiconductor nanoparticle composition, the nanoparticle size, and/or the dopant element.

The present invention provides a chemochromic article that darkens or lightens when a chemical redox agent oxidizes or reduces, respectively, the transition-metal dopant in or on the nanoparticle. A "redox" agent is another term for an agent that causes an oxidation-reduction reaction.

Heretofore, chemochromics have required switching the redox state of an entire molecule or complex. By contrast, the disclosed technology enables an absorption change via switching the electronic state only of the dopant. Because the transition-metal dopants make up a relatively small part (e.g., about 1 wt %) of the entire material, there is a significant reduction in the energy needed to trigger the absorption change of the entire material. The absorption change is accomplished with a reduction in required chemical input by one or two orders of magnitude, compared to existing chemochromics. Importantly, only the dopant needs to be chemically switched (oxidized or reduced) to change the absorption state of everything. The resulting conversion-efficient color change allows for significantly reduced electron transfer to switch the optical state.

As stated in the Background, existing chemochromics are only active within a set wavelength range based on the composition. To attain redox-switchable absorption in another range, conventionally, an entirely new molecule, complex, or metal ion must be used. The present disclosure overcomes this challenge by deploying transition-metal redox-labile dopants in the semiconductor nanoparticles.

Compared to existing chemochromics, in the disclosed invention, the wavelengths that absorb light once the chemochromism is triggered are more tunable. The chemochromic article can be active in the UV, visible, NIR, MWIR, and/or LWIR because the chemochromism utilizes tunable midgap states for the new absorption following chemical redox. Chemochromism is triggered by the redox agents which turn off or on the photochromic darkening function.

There are many applications of chemochromics that can be optically switched by targeted redox of a small part of the material and that have a tunable optical protection waveband. For example, the disclosed chemochromic articles may be used in windshield glare protection and darkening windows with lower energy requirements than current electrochromics. Intrusive light can block operator vision and blind sensors for autonomous vehicles. No visible-through-LWIR tunable optical protection exists in active devices today without needing to switch the redox/ordering of the entire material. The present invention provides a solution that does not require switching the redox/ordering of the entire material (i.e., every molecule, complex, or ion present). The present invention provides a tunable chemochromic waveband. In the Examples herein, it is demonstrated that chemochromism is triggered by switching the redox state for only the dopant in the nanoparticle, and the optical darkening range can be tuned within visible to NIR light.

Some variations provide a chemochromic article comprising:

(a) semiconductor nanoparticles that have an average nanoparticle effective diameter from about 1 nanometer to about 20 nanometers;

(b) transition-metal dopant particles disposed on surfaces of the semiconductor nanoparticles and/or within the semiconductor nanoparticles, wherein the transition-metal dopant particles are capable of undergoing reversible oxidation and reduction, and wherein the transition-metal dopant particles are present in an amount from about 0.001% to about 5% of the weight of the semiconductor nanoparticles;

(c) a redox agent that is capable of changing an oxidation state of the transition-metal dopant particles;

(d) ligands bonded to the semiconductor nanoparticles, wherein the ligands contain a carboxylate functional group, a thiol functional group, an amine functional group, or a combination thereof; and (e) optionally, a matrix surrounding the semiconductor nanoparticles or surrounding a solution containing the semiconductor nanoparticles.

In some embodiments, the semiconductor nanoparticles are selected from the group consisting of single-element nanoparticles, two-element nanoparticles, three-element nanoparticles, four-element nanoparticles, and combinations thereof.

In certain embodiments, single-element nanoparticles are selected from the group consisting of Si, Ge, and combinations thereof.

In certain embodiments, two-element nanoparticles are selected from the group consisting of ZnS, ZnSe, ZnTe, CdS, CdSe, CdTe, PbS, PbSe, PbTe, InP, InAs, InSb, GaP, GaAs, $Ag_2S$, $Ag_2Se$, $Ag_2Te$, and combinations thereof.

In certain embodiments, the three-element nanoparticles are selected from the group consisting of $Zn_xCd_{1-x}S$, $Zn_xCd_{1-x}Se$, $Zn_xCd_{1-x}Te$, $Zn_xPb_{1-x}S$, $Zn_xPb_{1-x}Se$, $Zn_xPb_{1-x}Te$, $Zn_xSn_{1-x}S$, $Zn_xSn_{1-x}Se$, $Zn_xSn_{1-x}Te$, $Pb_xSn_{1-x}S$, $Pb_xSn_{1-x}Se$, $Pb_xSn_{1-x}Te$, $In_xGa_{1-x}P$, $In_xGa_{1-x}As$, $Ag_{2x}Cd_{1-x}S$, $Ag_{2x}Cd_{1-x}Se$, $Ag_{2x}Cd_{1-x}Te$, $Ag_{2x}Pb_{1-x}S$, $Ag_{2x}Pb_{1-x}Se$, $Ag_2$: $Pb_{1-x}Te$, $Ag_{2x}Sn_{1-x}S$, $Ag_{2x}Sn_{1-x}Se$, $Ag_{2x}Sn_{1-x}Te$ ($0<x<1$), and combinations thereof.

In certain embodiments, four-element nanoparticles are selected from the group consisting of copper indium gallium selenide, copper zinc tin sulfide, and combinations thereof.

When the semiconductor nanoparticles contain a combination of specific nanoparticles having different numbers of elements, the combination may be a mixture, with no chemical bonding between the semiconductor nanoparticles. In other embodiments, the semiconductor nanoparticles contain specific nanoparticles having different numbers of elements, in which there is chemical bonding (e.g., ionic bonding, covalent bonding, or metallic bonding) or at least weak forces that may attract the nanoparticles to each other.

The semiconductor nanoparticles may be selected to have a bandgap (i.e., bandgap energy) from about 0.1 eV to about 5 eV, for example, measured at 25° C. and 1 bar. In various embodiments, the semiconductor nanoparticles are selected to have a bandgap of about, at least about, or at most about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or 5 eV, including any intervening range, measured at 25° C. and 1 bar.

In some embodiments, the average nanoparticle effective diameter is from about 1 nanometer to about 5 nanometers. In various embodiments, the average nanoparticle effective diameter is about, at least about, or at most about 1 nm, 1.5 nm, 2 nm, 2.5 nm, 3 nm, 3.5 nm, 4 nm, 4.5 nm, 5 nm, 5.5 nm, 6 nm, 6.5 nm, 7 nm, 7.5 nm, 8 nm, 9 nm, 10 nm, 11 nm, 12 nm, 13 nm, 14 nm, 15 nm, 16 nm, 17 nm, 18 nm, 19 nm, or 20 nm, including any intervening range. The effective diameter of a nanoparticle is its diameter in the case of a sphere, a cylinder, a needle, or a rod. For other geometries, the effective diameter is $(6V/\pi)^{1/3}$, where Vis the volume of a nanoparticle.

Particle sizes may be measured by a variety of techniques, including dynamic light scattering, laser diffraction, x-ray diffraction peak fitting via Scherrer analysis, or image analysis, for example. Dynamic light scattering is a non-invasive, well-established technique for measuring the size and size distribution of particles typically in the submicron region, and with the latest technology down to 1 nanometer. Laser diffraction is a widely used particle-size measurement technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images.

The shape of the semiconductor nanoparticles may vary. In some embodiments, the nanoparticles are spherical or approximately spherical. In various embodiments, the nanoparticles are spheres, rods, needles, platelets, cubes, pyramids, ovoids, randomly shaped objects, or a combination thereof.

Figure 2:
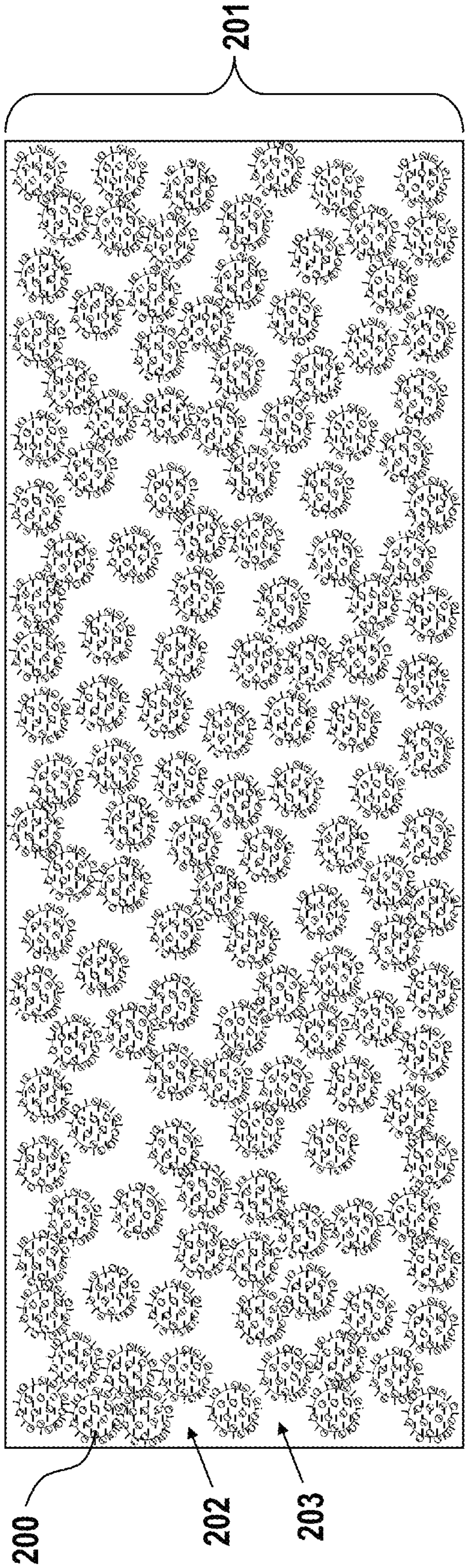
FIG. 2 depicts an exemplary chemochromic article, in various embodiments.

The semiconductor nanoparticles are distinct semiconductor nanoparticles, as depicted in FIG. 2, not grains of a single piece of bulk polycrystalline semiconductor material. The analytical techniques recited above to measure nanoparticle size (e.g., dynamic light scattering) may be used to show that the chemochromic article contains distinct semiconductor nanoparticles rather than grains of a bulk material.

Another way to demonstrate the presence of distinct semiconductor nanoparticles is with a bandgap analysis. In a bulk polycrystalline semiconductor, the bandgap is fixed due to a continuous energy state. In individual semiconductor nanoparticles, the bandgap is size-dependent and can be altered to produce a range of energies between the valence band and conduction band. This is the quantum confinement effect. Semiconductor nanoparticles that are small enough to be governed by the quantum confinement effect are known as "quantum dots". Generally speaking, quantum confinement can be observed once the diameter of a semiconductor nanoparticle is of the same magnitude as the de Broglie wavelength of the electron wave function. When semiconductor nanoparticles are this small, their electronic and optical properties deviate substantially from the electronic and optical properties of bulk materials made from the same composition. The result is that the bandgap becomes dependent on particle size. As the size of the semiconductor decreases, the electrons and electron holes come closer in space, and the energy required to activate them increases. The bandgap of each individual semiconductor nanoparticle (quantum dot) is thus higher than the bandgap of the bulk semiconductor material of the same composition as the quantum dots.

The concentration of semiconductor nanoparticles within the chemochromic article may vary, such as from about 5 wt % to about 99.99 wt %, depending on the concentrations of dopant particles, redox agent, ligands, and matrix, all described later. In some embodiments, the concentration of semiconductor nanoparticles within the chemochromic article is at least 90 wt %. In various embodiments, the concentration of semiconductor nanoparticles within the chemochromic article is about, at least about, or at most about 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 91 wt %, 92 wt %, 93 wt %, 94 wt %, 95 wt %, 96 wt %, 97 wt %, 98 wt %, 99 wt %, 99.5 wt %, 99.9 wt %, 99.95 wt %, or 99.99 wt %, including any intervening range (e.g., 75-99 wt %).

In some embodiments, the transition-metal dopant particles contain a transition metal selected from the group consisting of copper (Cu), iron (Fe), silver (Ag), europium (Eu), and combinations thereof. Combinations of transition-metal dopant particles refers to the possibility to employ two or more transition metals, such as both copper (Cu) and silver (Ag), within the nanoparticle. Typically, when two or more transition metals are used, there is not any intermetallic bonding between the metal elements. The elements may dissolve as a solid solution into the nanoparticle matrix, or remain as separate metal (dopant) phases. Other transition metals may be employed as dopants, such as nickel (Ni), manganese (Mn), cobalt (Co), and/or vanadium (V), for example, either with or without one or more of Cu, Fe, Ag, or Eu. Other transition metals may be used as dopants, such as Zn, Cr, V, Ti, Sc, Cd, Pd, Rh, Ru, Tc, Mo, Nb, Zr, Y, Hg, Au, Pt, Ir, Os, Re, W, Ta, Hf, La, Lu, Yb, Tm, Er, Ho, Dy, Tb, Gd, Sm, Pm, Nd, Pr, Ce, and combinations thereof. The transition-metal dopant particles preferably are pure metal ions and not metal compounds such as halides, oxides, nitrides, sulfides, etc. For example, when the transition-metal dopant particles are copper, it is preferred that the dopant particles contain pure Cu(II) and not $CuCl_2$ or other copper halides. In the case of dopant particles, a "combination" of transition metals means that the elements remain atomic in nature in order to function as dopants. Thus for example a combination of Cu and Ag means there are separate Cu(II) and Ag(I) dopant particles, not intermetallic Cu—Ag compounds. While the dopant particles are preferably pure metals, it will be recognized that impurities (including metal compounds) may be present in the transition-metal dopant particles, such that absolute purity (100 wt %) is not strictly necessary.

In some embodiments, the transition-metal dopant particles are incorporated (e.g., absorbed or intercalated) into a crystal lattice of the semiconductor nanoparticles. In other embodiments, the transition-metal dopant particles are incorporated on surfaces of the semiconductor nanoparticles. In certain embodiments, the transition-metal dopant particles are both incorporated into a crystal lattice of, as well as incorporated on surfaces of, the semiconductor nanoparticles.

The transition-metal dopant particles are physically distinct from the semiconductor nanoparticles, as depicted in FIG. 1 showing dopant particles 120 and a single semiconductor nanoparticle 110. In some embodiments in which a common metal, such as silver, is contained both in semiconductor nanoparticles (e.g., $Ag_2S$) and in dopant particles (e.g., Ag), the dopant particles are physically different than the Ag content of the $Ag_2S$ nanoparticles. In this case, the Ag dopant atoms are not part of the orthorhombic crystals of the $Ag_2S$ nanoparticles. In other embodiments, transition-metal dopant atoms can replace metal atoms in a lattice. For example, in the case of ZnS semiconductor nanoparticles and Cu dopant particles, the Cu dopant atoms may replace Zn atoms in the ZnS lattice, in which case the Cu atoms are bonded within the lattice structure. When the Cu dopant particles are at the surface of the semiconductor nanoparticles, the Cu dopant particles can take the form of Cu ions (e.g., $Cu^{2+}$) that are ionically bonded to a terminal sulfur ion of ZnS, or the Cu ions can replace Zn atoms at the edge of the nanoparticle crystal, for example.

In some embodiments, the oxidation potential of the transition-metal dopant particles is less than the oxidation potential of the semiconductor nanoparticle anion. Also, in some embodiments, the reduction potential of the transition-metal dopant particles is less than the reduction potential of the semiconductor nanoparticle anion. Using these constraints, changing the dopant redox state does not change the oxidation state of the nanoparticle itself.

The size of each transition-metal dopant particle is typically less than the average nanoparticle effective diameter. A transition-metal dopant particle may be as small as a volume defined by a single dopant atom, or as large as about one-half of the average nanoparticle effective diameter, for example, when a dopant particle contains a dopant phase with a plurality of dopant atoms. In various embodiments, the average effective diameter of the dopant particles is about, at least about, or at most about 0.1 nm, 0.2 nm, 0.3 nm, 0.4 nm, 0.5 nm, 0.6 nm, 0.7 nm, 0.8 nm, 0.9 nm, 1 nm, 2 nm, 3 nm, 4 nm, 5 nm, 6 nm, 7 nm, 8 nm, 9 nm, or 10 nm, including any intervening range.

In some embodiments, the transition-metal dopant particles are present in an amount from about 0.1% to about 2% of the weight of the semiconductor nanoparticles. In various embodiments, the transition-metal dopant particles are present in an amount, based on the weight of the semiconductor nanoparticles, of about, at least about, or at most about 0.001%, 0.002%, 0.005%, 0.01%, 0.02%, 0.03%, 0.04%, 0.05%, 0.1%, 0.15%, 0.2%, 0.25%, 0.3%, 0.35%, 0.4%, 0.45%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, or 5.0%, including any intervening range (e.g., 0.01-4% or 0.1-3%).

The concentration of transition-metal dopant particles may also be given as a percentage of the elements of the semiconductor nanoparticles other than chalcogens (Group 16 elements, such as O, S, Se, or Te). On this basis, the transition-metal dopant particles may be present in an amount from about 0.001% to about 5% of the weight of all non-chalcogen elements in the semiconductor nanoparticles. In certain embodiments, the transition-metal dopant particles are present in an amount from about 0.1% to about 2% of the weight of all non-chalcogen elements in the semiconductor nanoparticles.

The transition-metal dopant particles are the only component of the semiconductor nanoparticle that needs to be oxidized or reduced to produce a color change. Chemical oxidation of the transition-metal dopant particles creates a new absorption (causing darkening) between the semiconductor valence band and the oxidized dopant midgap energy orbital. The absorbed wavelengths from the midgap electronic state form a responsive absorption range. Chemical reduction of the transition-metal dopant particles fills the midgap hole and reverses the darkening.

Preferably, the redox agent is not strong enough to change the oxidation state of the semiconductor material (e.g., ZnS) of the nanoparticle. Although no oxidation or reduction of the semiconductor nanoparticle itself (excluding the dopant) is required in this invention, in certain embodiments a small amount of oxidation or reduction of the semiconductor nanoparticle, or elements thereof, may occur. For example, in the case of Cu-doped ZnS, in which Cu undergoes reversible redox chemistry, a small amount of zinc oxidation or sulfur reduction may occur when dissociated Zn and S elements recombine, for example. These reactions are regarded as incidental, however. In preferred embodiments, the redox agent and the redox reaction conditions are collectively not strong enough to also oxidize or reduce any nanoparticle elements.

The redox agent may be an organic redox agent, an inorganic redox agent, of a mixture thereof. In some embodiments, the redox agent is selected from the group consisting of sodium iodate ($NaIO_3$), potassium iodate ($KIO_3$), hexacyanoferrate(III) which is $[Fe(CN)_6]^{3-}$, p-benzoquinone, sodium thiosulfate ($Na_2S_2O_3$), potassium thiosulfate ($K_2S_2O_3$), sodium borohydride ($NaBH_4$), lithium aluminum hydride ($LiAlH_4$), diisobutylaluminum hydride, benzoyl peroxide, dicumyl peroxide, iodine ($I_2$), triiodide ($I_3$), and combinations thereof.

Hexacyanoferrate(III) may have various counterions, such as potassium, to form a neutral molecule, $K_3[Fe(CN)_6]_3$. $[Fe(CN)_6]^{3-}$ may also be used as a redox agent in ionic form, converting via reduction (addition of an electron) to $[Fe(CN)_6]^{4-}$, for example.

In the chemochromic article, the redox agent may be present at a redox-agent concentration selected from about 0.001 wt % to about 10 wt % on the basis of total weight of the chemochromic article. In various embodiments, the redox-agent concentration is about, at least about, or at most about 0.001 wt %, 0.005 wt %, 0.01 wt %, 0.05 wt %, 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 2 wt %, 3 wt %, 4 wt %, 5 wt %, 6 wt %, 7 wt %, 8 wt %, 9 wt %, or 10 wt %, including any intervening range. Generally, the redox-agent concentration is selected, at least in part, based on the concentration of transition-metal dopant particles in the nanoparticles, to ensure that enough redox agent is present for the desired mechanism. Excess redox agent may be used to assist in the chemical kinetics, if desired.

The redox agents, before nanoparticle dopant oxidation or reduction, are preferably transparent in the visible spectrum. In certain embodiments, a colored redox agent may be used to balance the color of the nanoparticles. For example, if the nanoparticles absorb at <500 nm, a redox agent may be selected to absorb at 400-500 nm, to provide uniform absorption.

A chemochromic precursor article may also be provided, with no redox agent yet present. In some embodiments, a chemochromic precursor article comprises:

semiconductor nanoparticles that have an average nanoparticle effective diameter from about 1 nanometer to about 20 nanometers;

transition-metal dopant particles disposed on surfaces of the semiconductor nanoparticles and/or within the semiconductor nanoparticles, wherein the transition-metal dopant particles are capable of undergoing reversible oxidation and reduction, and wherein the transition-metal dopant particles are present in an amount from about 0.001% to about 5% of the weight of the semiconductor nanoparticles;

ligands bonded to the semiconductor nanoparticles, wherein the ligands contain a carboxylate functional group, a thiol functional group, an amine functional group, or a combination thereof; and optionally, a matrix surrounding the semiconductor nanoparticles or surrounding a solution containing the semiconductor nanoparticles.

The ligands bonded to the semiconductor nanoparticles may be organic ligands, inorganic ligands, or a combination of organic and inorganic ligands. The ligands are preferably hole-trapping ligands, but may provide other chemical functionality in addition to, or instead of, hole trapping.

In some embodiments, the ligands contain a carboxylate functional group. For example, the ligands may be selected from the group consisting of 4-pentenoate, phenylacetate, 3-phenylpropionate, 4-phenylbutyrate, methacrylate, oleate, and combinations thereof.

In some embodiments, the ligands contain a thiol functional group. For example, the ligands may be selected from the group consisting of 2-propene-1-thiol, benzenethiol, and combinations thereof.

In some embodiments, the ligands contain an amine functional group. For example, the ligands may be selected from the group consisting of porphyrins, aniline, benzylamine, phenethylamine, phenylpropylamine, oleylamine, 2-aminoethanol, 3-aminopropanol, and combinations thereof.

There may be various types of bonds between ligands and semiconductor nanoparticles, including chemical bonds (e.g., ionic bonds, covalent bonds, or metallic bonds), which may also be referred to as chemisorption of ligands on semiconductor nanoparticles. Alternatively, or additionally, there may be physisorption of ligands on semiconductor nanoparticles. Physisorption may arise from the van der Waals force, a distance-dependent interaction between atoms or molecules. Unlike ionic or covalent bonds, van der Waals attractions do not result from a chemical electronic bond.

The number of ligands per semiconductor nanoparticle may vary widely, such as from 1 to 1000, e.g. about, at least about, or at most about 1, 2, 3, 4, 5, 6, 7, 8, 9, 10, 50, 100, 200, 300, 400, 500, 600, 700, 800, 900, or 1000, including any intervening range. In a given chemochromic article, the total number of ligands bonded to semiconductor nanoparticles, divided by the total number of semiconductor nanoparticles, gives the number of ligands per semiconductor nanoparticle.

The concentration of ligands within the chemochromic article may vary, such as from about 0.01 wt % to about 50 wt %. In various embodiments, the concentration of ligands within the chemochromic article is about, at least about, or at most about 0.01 wt %, 0.1 wt %, 0.2 wt %, 0.3 wt %, 0.4 wt %, 0.5 wt %, 1 wt %, 2 wt %, 3 wt %, 4 wt %, 5 wt %, 6 wt %, 7 wt %, 8 wt %, 9 wt %, 10 wt %, 15 wt %, 20 wt %, 25 wt %, 30 wt %, 35 wt %, 40%, 45 wt %, or 50 wt %, including any intervening range.

In preferred embodiments, the ligands are fully bonded to the semiconductor nanoparticles. It is possible for there to be some free organic material containing an organic ligand that is not bonded to the semiconductor nanoparticles. For example, in the case of 4-pentenoate ($CH_2{=}CHCH_2CH_2COO$) as the ligand, usually bonded as $CH_2{-}CHCH_2CH_2COO{-}NP$ where NP is nanoparticle, there may be free 4-pentenoic acid ($CH_2{-}CHCH_2CH_2COOH$) present in the chemochromic article. It is also possible for there to be some ligands bonded to dopant particles. For example, in the case of copper as dopant particles and 4-pentenoate as ligand, there may be some dynamic bonding to form $CH_2{=}CHCH_2CH_2COO{-}Cu$ or $CH_2{-}CHCH_2CH_2COO{-}Cu{-}OOCCH_2CH_2CH{=}CH_2$, for example. In various embodiments, any ligands present in the chemochromic article are at least 90 wt %, preferably at least 95 wt %, more preferably at least 99 wt %, and most preferably at least 99.9 wt % (e.g., 100 wt %) bonded to the semiconductor nanoparticles.

In the chemochromic article, the matrix (when used) may be present at a matrix concentration selected from about 1 wt % to about 90 wt % on the basis of total weight of the chemochromic article. In various embodiments, the matrix concentration is about, at least about, or at most about 1 wt %, 2 wt %, 5 wt %, 10 wt %, 15 wt %, 20 wt %, 25 wt %, 30 wt %, 40 wt %, 50 wt %, 60 wt %, 70 wt %, 80 wt %, or 90 wt %, including any intervening range.

In some embodiments, the matrix is an organic matrix. In other embodiments, the matrix is an inorganic matrix. In certain embodiments, the matrix is a hybrid organic-inorganic matrix.

In various embodiments, the matrix surrounding the semiconductor nanoparticles is or contains an organic polymer, an organic electrolyte, or a combination thereof, for example.

In some embodiments using electrolyte polymers in the matrix, electrolyte polymers allow electrochemical tuning of the dopant oxidation state if a potential is held across the matrix. Electrolyte polymers for the matrix may be selected from polyethylene oxide, polypropylene oxide, polycarbonates, or polysiloxanes, for example.

An electrolyte polymer may be a polyethylene oxide complex formed with a metal salt, such as PEO-Cu $(CF_3SO_3)_2$ which is a Cu-ion conductor according to Bonino et al., "Electrochemical properties of copper-based polymer electrolytes" *Electrochimica Acta*, Volume 37, Issue 9, Pages 1711-1713 (1992), which is incorporated by reference.

A gel electrolyte may be utilized, such as a liquid electrolyte (aqueous or non-aqueous solvent+salt) in a polymer host, in the matrix. Liquid electrolyte solvents in a gel electrolyte may be water, dimethyl carbonate, diethyl carbonate, propylene carbonate, ethylene carbonate, γ-butyrolactone, or a combination thereof, for example. Salts in a gel electrolyte may be salts of any of transition metals, metalloids, alkali metals, or alkaline earth metals. For example, the gel electrolyte may use salts of V, Ti, Cr, Co, Ni, Cu, Zn, Tb, W, Ag, Cd, Au, Al, Ga, Ge, As, Se, Sn, Sb, Te, Bi, Li, Na, K, Mg, Ca, or a combination thereof.

Alternatively, or additionally, the matrix surrounding the semiconductor nanoparticles may be or contain an inorganic oxide. An inorganic oxide may be selected from the group consisting of $SiO_2$, ZnO, $Al_2O_3$, $ZrO_2$, and combinations thereof, for example.

The matrix surrounding the semiconductor nanoparticles may be or contain a solid electrolyte. For example, the solid electrolyte may be selected from oxide-based electrolytes, such as β-alumina, Cu—B-alumina, Ag-β-alumina, or a combination thereof. The solid electrolyte may be selected from sulfide-based electrolytes, such as $Li_{10}GeP_2S_{12}$, $Na_2S{-}P_2S_5$, $Li_2S{-}P_2S_5$, or a combination thereof. The solid electrolyte may be selected from LiSiCON, i.e. lithium superionic conductor, which refers to a family of solids with the chemical formula $Li_{2+2x}Zn_{1-x}GeO_4$ ($-0.5<x<1$). The solid electrolyte may be selected from cuprous halides, such as CuCl, CuBr, CuI, or a combination thereof. The solid electrolyte may be a copper sulfide, such as $Cu_{2-\alpha}$ S ($0\leq\alpha\leq1$). The solid electrolyte may be or include a $Ag^+$ conductor, such as AgI (0.1 S/cm at 150° C.), AgI—$Ag_2SeO_4$, $RbAg_4I_5$, or a combination thereof.

In some embodiments, the semiconductor nanoparticles are in solution, and are not encapsulated by a matrix. The solution also contains the redox agent. When the semiconductor nanoparticles are not surrounded by a solid matrix, ligands are preferably used on the semiconductor nanoparticles to keep them in solution.

The chemochromic article may further comprise an ionic charge-compensating species contained within the semiconductor nanoparticles and/or contained on surfaces of the semiconductor nanoparticles. When present, the ionic charge-compensating species may be selected from the group consisting of $Li^+$, $Na^+$, $K^+$, $Mg^{2+}$, $H^+$, and combinations thereof. In some embodiments, the ionic charge-compensating species gets ejected, removing positive charge from the system-avoiding a net positive charge. As an example, in the process of Cu oxidation (forming $Cu^{2+}$), a mobile cationic species (e.g., $Mg^{2+}$) may be ejected to maintain charge neutrality of the nanoparticle. In another example, charge compensation offsets Cu oxidation as follows:

$$Zn_{0.98}Cu_{0.01}^{(I)}Li_{0.01}S_{0.99}+\text{oxidizing agent}\rightarrow Zn_{0.98}Cu_{0.01}^{(II)}S_{0.99}+0.01\ Li^{+}+\text{reduced oxidizing agent}$$

The concentration of the ionic charge-compensating species may be from about 0.1% to about 2% of the weight of the semiconductor nanoparticles. In various embodiments, the ionic charge-compensating species are present in an amount, based on the weight of the semiconductor nanoparticles, of about, at least about, or at most about 0.001%, 0.002%, 0.005%, 0.01%, 0.02%, 0.03%, 0.04%, 0.05%, 0.1%, 0.15%, 0.2%, 0.25%, 0.3%, 0.35%, 0.4%, 0.45%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, or 5.0%, including any intervening range.

Some embodiments can be understood with reference to FIG. 1, which depicts an exemplary chemochromic doped nanoparticle 100 (not drawn to scale) and is a two-dimensional representation of a three-dimensional object. In FIG. 1, the chemochromic doped nanoparticle 100 comprises a semiconductor nanoparticle 110, many transition-metal dopant particles 120 disposed on surfaces of, and/or within, the semiconductor nanoparticle 110, and ligands 130 bonded to the semiconductor nanoparticle 110. The number of transition-metal dopant particles 120 and the number of ligands 130 may vary; the specific numbers shown in FIG. 1 are only for purposes of illustration. In typical embodiments of a chemochromic article, there would be a plurality of semiconductor nanoparticles 110, not just a single semiconductor nanoparticle 110 (e.g., see FIG. 2). The transition-metal dopant particles 120 that are shown within the circle representing the semiconductor nanoparticle 110 can be regarded as either attached to the outer surface of the semiconductor nanoparticle 110, or disposed within the semiconductor nanoparticle 110 (i.e., within an internal phase of the nanoparticle). The ligand 130 at about the 11 o'clock position is behind (obscured by) the transition-metal dopant particle 120, and is not chemically bonded to the transition-metal dopant particle 120. The transition-metal dopant particles 120 are by no means limited to an aspect ratio of 1:6 (diameter of a metal dopant particle 120 divided by diameter of semiconductor nanoparticle 110) as implied in FIG. 1. Also, the molecular size of the ligands 130 may vary. The ligands 130 are by no means limited to an aspect ratio of 1:1 with the transition-metal dopant particles 120 (outward length of a ligand 130 divided by diameter a metal dopant particle 120). The semiconductor nanoparticle 110 and the transition-metal dopant particles 120 are not necessarily spherical as illustrated in FIG. 1. The ligand 130 will generally take a molecular shape (e.g., linear or bent) dictated by local bonding and electrostatic forces.

Some embodiments can be understood with reference to FIG. 2, which depicts an exemplary chemochromic article. FIG. 2 is not drawn to scale and is a two-dimensional representation (side view) of a three-dimensional object. In FIG. 2, the chemochromic article contains a plurality of chemochromic doped nanoparticles 200, which are shown in zoomed-in form in FIG. 1. In particular, FIG. 1 depicts a single chemochromic doped nanoparticle 100, while FIG. 2 depicts many chemochromic doped nanoparticles 200. Each chemochromic doped nanoparticle 200 comprises a semiconductor nanoparticle; transition-metal dopant particles disposed on surfaces of, and/or within, the semiconductor nanoparticle; and ligands bonded to the semiconductor nanoparticle. For clarity, the individual elements of each chemochromic doped nanoparticle 200 are not labeled in FIG. 2 but are labeled in FIG. 1. The chemochromic doped nanoparticles 200 are surrounded by a matrix 202, which may contain an organic material, an inorganic material, or a combination thereof. The matrix 202 may go between the ligands and may touch the dopant particles, if the matrix is well-mixed. Alternatively, the matrix 202 may surround the outer tips of the ligands but not penetrate all the way to the semiconductor nanoparticles, forming a matrix bubble (of vacuum or gas) around each nanoparticle. A redox-labile species 203 is disposed within the chemochromic article, in spaces around the chemochromic doped nanoparticles 200. The redox-labile species 203 may be disposed within the matrix 202, or the redox-labile species 203 may be in a separate phase, such within porous regions of the matrix 202. The redox-labile species 203 needs to be able to be transported (e.g., by diffusion or permeation) to the transition-metal dopant particles that are in the chemochromic doped nanoparticles 200. The chemochromic doped nanoparticles 200 collectively form a chemochromic region 201.

In some embodiments, the chemochromic article is contained within an electrochemical cell. An electrochemical cell can be used to accomplish the electrochemical reactions that enable the reversible redox mechanism employed herein. The chemochromic nanoparticles may be contained in an electrochemical cell in which the electrodes in the cell change the oxidation state of redox species (also referred to as redox agents) that diffuse to the nanoparticles and change the redox state of a dopant in the nanoparticles.

Some variations of the invention provide an electrochemical cell for controlling a chemochromic assembly, the electrochemical cell comprising:

(A) a chemochromic assembly comprising:

semiconductor nanoparticles that have an average nanoparticle effective diameter from about 1 nanometer to about 20 nanometers;

transition-metal dopant particles disposed on surfaces of the semiconductor nanoparticles and/or within the semiconductor nanoparticles, wherein the transition-metal dopant particles are capable of undergoing reversible oxidation and reduction, and wherein the transition-metal dopant particles are present in an amount from about 0.001% to about 5% of the weight of the semiconductor nanoparticles;

ligands bonded to the semiconductor nanoparticles, wherein the ligands contain a carboxylate functional group, a thiol functional group, an amine functional group, or a combination thereof; and optionally, a matrix surrounding the semiconductor nanoparticles or surrounding a solution containing the semiconductor nanoparticles;

(B) one or more redox-labile species that are capable of changing an oxidation state of the transition-metal dopant particles;

(C) a positive electrode;

(D) a negative electrode; and (E) an electrolyte.

In some embodiments of an electrochemical cell, the transition-metal dopant particles contain a transition metal selected from the group consisting of Cu, Fe, Ag, Eu, and combinations thereof. The transition metal may be in any oxidation state. In the case of copper, for example, the copper may be present as elemental $Cu^0$, copper (I) ions $Cu^+$, copper(II) ions $Cu^{2+}$, or a combination thereof. The transition metal undergoes reversible oxidation and reduction within the semiconductor nanoparticles, which means that there must be at least two different oxidation states at different times, and which also means that the transition metal does not solely remain as elemental particles during use of the chemochromic article.

In some embodiments of an electrochemical cell, the transition-metal dopant particles are present in an amount from about 0.1% to about 2% of the weight of the semiconductor nanoparticles. In various embodiments of an electrochemical cell, the transition-metal dopant particles are present in an amount, based on the weight of the semiconductor nanoparticles, of about, at least about, or at most about 0.001%, 0.002%, 0.005%, 0.01%, 0.02%, 0.03%, 0.04%, 0.05%, 0.1%, 0.15%, 0.2%, 0.25%, 0.3%, 0.35%, 0.4%, 0.45%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, or 5.0%, including any intervening range.

In the electrochemical cell, the term "chemochromic assembly" is used to distinguish from the earlier-described chemochromic article. The chemochromic assembly does not contain the redox-labile species; the latter species is contained in the electrochemical cell in a configuration that enables the redox-labile species to diffuse or otherwise be transported to the transition-metal dopant particles, for redox chemistry to take place.

In some embodiments of an electrochemical cell, the redox-labile species is selected from the group consisting of $NaIO_3$, $KIO_3$, $[Fe(CN)_6]^{3-}$, p-benzoquinone, $Na_2S_2O_3$, $K_2S_2O_3$, $NaBH_4$, $LiAlH_4$, diisobutylaluminum hydride, benzoyl peroxide, dicumyl peroxide, $I_2$, $I_3^-$, and combinations thereof. If only one redox-labile species is used in the electrochemical cell, the redox-labile species must be electrochemically reversible. If two (or more) redox-labile species are used, at least one redox-labile species is an oxidizing agent and at least one redox-labile species is a reducing agent.

There may be only one redox-labile species if it is electrochemically reversible, such as $[Fe(CN)_6]_3$. One oxidation state of this species (e.g., $[Fe(CN)_6]^{3-}$) would perform an oxidation of the nanoparticle dopant, while another oxidation state (e.g., $[Fe(CN)_6]^{4-}$) would perform a reduction of the nanoparticle dopant. A constant electrochemical-cell potential may be applied to maintain a higher concentration of the preferred oxidation state of the redox agent.

In some embodiments, a redox-labile species first undergoes an electrochemical conversion to the desired oxidation state and then performs oxidation/reduction of the nanoparticle dopant. In these embodiments, the redox-labile species is initially in a chemically unreactive (non-spontaneous) state, such that it does not automatically perform the oxidation/reduction of the nanoparticle dopant, until the redox-labile species has first changed to the desired, electrochemically reactive state.

There may be two redox-labile species, forming a redox-agent pair. In a redox-agent pair, both of which may be electrochemically irreversible-one acts as an oxidizing agent and the other acts as a reducing agent. Preferably, the two redox-labile species are in a chemically unreactive (non-spontaneous) state to start. The redox-agent pair may be selected such that one redox agent is switched to the chemically reactive state by a positive potential and the other redox agent is switched to the chemically reactive state by a negative potential. Preferably, a redox agent acting as a reducing agent is not strong enough to also reduce any nanoparticle cations (e.g., $Zn^{2+}$).

The redox-labile species may be disposed within the matrix, either in the same phase as the matrix or in a different phase as the matrix. In some embodiments, the redox-labile species are contained within porous regions of the matrix. The redox-labile species can be located anywhere in the chemochromic article provided that the redox-labile species is able to be transported (e.g., by diffusion or permeation) to the transition-metal dopant particles that are in the chemochromic doped nanoparticles. In some embodiments, the redox-labile species are located in very close proximity to the transition-metal dopant particles, such that no mass transport is necessary (kinetically limited rather than mass-transfer-limited redox reactions).

In some embodiments of an electrochemical cell, the semiconductor nanoparticles are attached to the positive electrode, to the negative electrode, or to both the positive and negative electrodes. To enhance attachment to the electrode(s), the semiconductor nanoparticles may be mixed with an electrode-binding agent selected from the group consisting of polyvinylidene difluoride (PVDF), carboxymethyl cellulose (CMC), polytetrafluoroethylene (PTFE), and combinations thereof.

In some embodiments of an electrochemical cell, the positive electrode and the negative electrode each contain an electrode material independently selected from the group consisting of platinum, gold, glassy carbon, graphite, stainless steel, tungsten, indium tin oxide, and combinations thereof. The material of the different electrodes may be the same or different. A conductive additive, such as carbon black, may be added to the positive electrode and/or the negative electrode. Optionally, a reference electrode may be used in the electrochemical cell, for monitoring the electrochemical state.

The electrolyte may include salts of any of transition metals, metalloids, alkali metals, or alkaline earth metals. For example, salts in the electrolyte may be salts of V, Ti, Cr, Co, Ni, Cu, Zn, Tb, W, Ag, Cd, Au, Al, Ga, Ge, As, Se, Sn, Sb, Te, Bi, Li, Na, K, Mg, Ca, or a combination thereof.

In some embodiments of an electrochemical cell, the electrolyte is selected from the group consisting of $LiSO_4$, $Na_2SO_4$, $KSO_4$, $LiCO_3$, KCl, $LiClO_4$, $KNO_3$, $LiPF_6$, and combinations thereof. In some embodiments, the semiconductor nanoparticles are dissolved in the electrolyte. In this specification, "dissolved" nanoparticles include nanoparticles suspended within the electrolyte.

In some embodiments of an electrochemical cell, the electrochemical cell further includes an electrolyte solvent selected from the group consisting of water, dimethylformamide, dimethylsulfoxide, dimethyl carbonate, diethyl carbonate, propylene carbonate, ethylene carbonate, γ-butyrolactone, acetone, ethers, toluene, tetrahydrofuran, acetonitrile, and combinations thereof.

All options, species types, species concentrations, and other selections, conditions, and parameters described above in reference to the chemochromic article are also applicable to an electrochemical cell that contains a chemochromic article.

Figure 3:
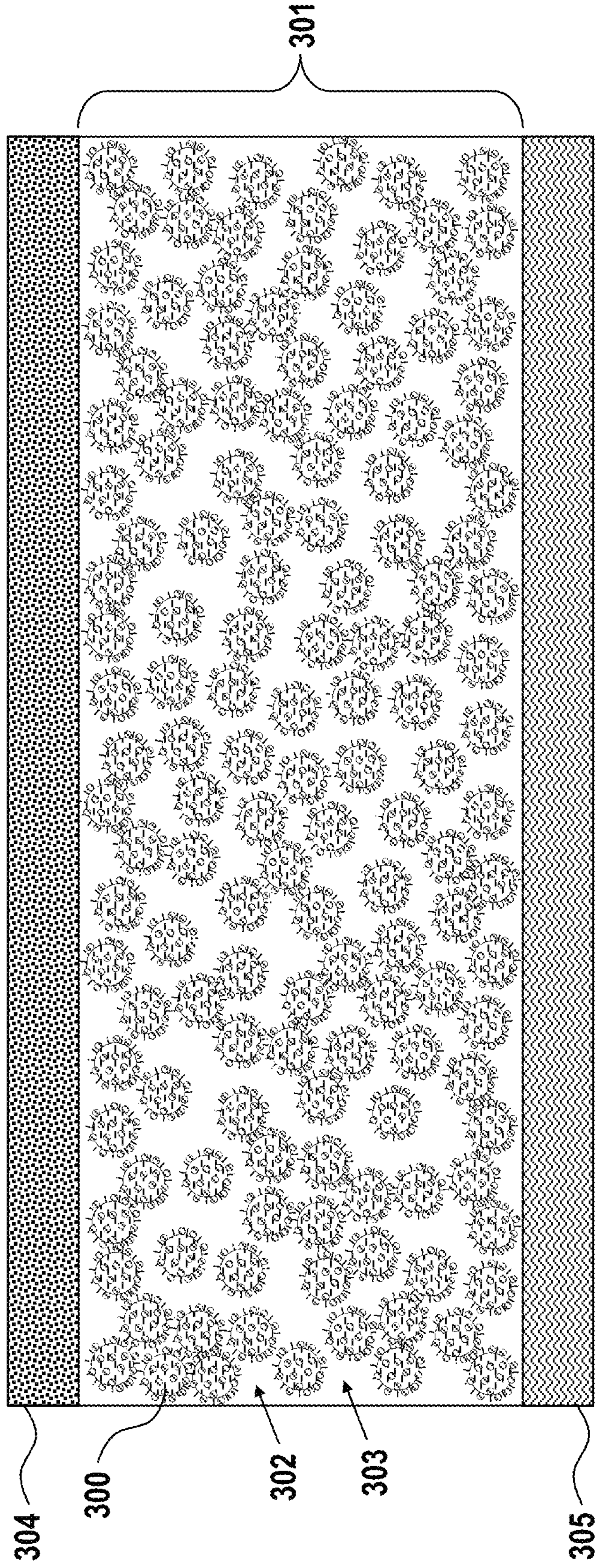
FIG. 3 depicts an exemplary electrochemical cell for controlling a chemochromic assembly, in various embodiments.

Some embodiments can be understood with reference to FIG. 3, which depicts an exemplary chemochromic system in the form of an electrochemical cell for controlling a chemochromic assembly. FIG. 3 is not drawn to scale and is a two-dimensional representation (side view) of a three-dimensional object. In FIG. 3, the chemochromic system contains a plurality of chemochromic doped nanoparticles 300, which are shown in zoomed-in form in FIG. 1. In particular, FIG. 1 depicts a single chemochromic doped nanoparticle 100, while FIG. 3 depicts many chemochromic doped nanoparticles 300. Each chemochromic doped nanoparticle 300 comprises a semiconductor nanoparticle; transition-metal dopant particles disposed on surfaces of, and/or within, the semiconductor nanoparticle; and ligands bonded to the semiconductor nanoparticle. For clarity, the individual elements of each chemochromic doped nanoparticle 300 are not labeled in FIG. 3 but are labeled in FIG. 1. The chemochromic doped nanoparticles 300 are surrounded by a matrix 302, which may contain an organic material, an inorganic material, or a combination thereof. The matrix 302 may go between the ligands and may touch the dopant particles, if the matrix is well-mixed. Alternatively, the matrix 302 may surround the outer tips of the ligands but not penetrate all the way to the semiconductor nanoparticles, forming a matrix bubble (of vacuum or gas) around each nanoparticle. A redox-labile species 303 is disposed within the electrochemical cell, in spaces around the chemochromic doped nanoparticles 300. The redox-labile species 303 may be disposed within the matrix 302, or the redox-labile species 303 may be in a separate phase, such within porous regions of the matrix 302. The redox-labile species 303 needs to be able to be transported (e.g., by diffusion or permeation) to the transition-metal dopant particles that are in the chemochromic doped nanoparticles 300. The chemochromic doped nanoparticles 300 collectively form a chemochromic region 301 that is interposed between a first electrode 304 and a second electrode 305. Each of the electrodes 304/305 is disposed in electrical or electrochemical communication with the chemochromic region 301, and preferably with all of the chemochromic doped nanoparticles 300. The polarities (+/−) of the electrodes 304/305 are opposite during operation, such that one electrode is positive and the other electrode is negative. The electrodes 304/305 are each connected to electrical leads (not shown) so that the electrodes may be activated when desired. When the electrodes 304/305 are activated, they may receive or transmit electrical current. Alternately, or additionally, when the electrodes 304/305 activated, they may electrochemically receive or transmit ions. The activation of electrodes 304/305 may be performed on demand, such as via a computer. In this way, the electrodes 304/305 collectively function as an on/off switch configured to reversibly activate the chemochromic region 301.

Other embodiments of the invention specifically employ a solid matrix surrounding the semiconductor nanoparticles. In these embodiments, the ligands are optional. That is, there may be no ligands at all bonded to the semiconductor nanoparticles.

Some embodiments provide a chemochromic article comprising:

(a) semiconductor nanoparticles that have an average nanoparticle effective diameter from about 1 nanometer to about 20 nanometers;

(b) transition-metal dopant particles disposed on surfaces of the semiconductor nanoparticles and/or within the semiconductor nanoparticles, wherein the transition-metal dopant particles are capable of undergoing reversible oxidation and reduction, and wherein the transition-metal dopant particles are present in an amount from about 0.001% to about 5% of the weight of the semiconductor nanoparticles;

(c) a redox agent that is capable of changing an oxidation state of the transition-metal dopant particles; and (d) a solid matrix surrounding the semiconductor nanoparticles or surrounding a solution containing the semiconductor nanoparticles.

The options, species types, species concentrations, and other selections, conditions, and parameters described above in reference to the chemochromic article with ligands are also applicable to a chemochromic article without ligands, except for the absence of those ligands.

Some embodiments provide an electrochemical cell for controlling a chemochromic assembly, the electrochemical cell comprising:

(A) a chemochromic assembly comprising:

semiconductor nanoparticles that have an average nanoparticle effective diameter from about 1 nanometer to about 20 nanometers;

transition-metal dopant particles disposed on surfaces of the semiconductor nanoparticles and/or within the semiconductor nanoparticles, wherein the transition-metal dopant particles are capable of undergoing reversible oxidation and reduction, and wherein the transition-metal dopant particles are present in an amount from about 0.001% to about 5% of the weight of the semiconductor nanoparticles; and a solid matrix surrounding the semiconductor nanoparticles or surrounding a solution containing the semiconductor nanoparticles;

(B) one or more redox-labile species that are capable of changing an oxidation state of the transition-metal dopant particles;

(C) a positive electrode;

(D) a negative electrode; and (E) an electrolyte.

The options, species types, species concentrations, and other selections, conditions, and parameters described above in reference to the electrochemical cell for controlling a chemochromic assembly with ligands are also applicable to a electrochemical cell for controlling a chemochromic assembly without ligands, except for the absence of those ligands.

Other variations provide a method to control a chemochromic article, the method comprising:

(i) providing a chemochromic assembly comprising:

semiconductor nanoparticles that have an average nanoparticle effective diameter from about 1 nanometer to about 20 nanometers;

transition-metal dopant particles disposed on surfaces of the semiconductor nanoparticles and/or within the semiconductor nanoparticles, wherein the transition-metal dopant particles are capable of undergoing reversible oxidation and reduction, and wherein the transition-metal dopant particles are present in an amount from about 0.001% to about 5% of the weight of the semiconductor nanoparticles;

ligands bonded to the semiconductor nanoparticles, wherein the ligands contain a carboxylate functional group, a thiol functional group, an amine functional group, or a combination thereof; and optionally, a matrix surrounding the semiconductor nanoparticles or surrounding a solution containing the semiconductor nanoparticles;

(ii) exposing the chemochromic assembly to a first redox agent to change the oxidation state of the transition-metal dopant particles, wherein step (ii) does not change the oxidation state of any elements in the semiconductor nanoparticles;

(iii) optionally, exposing the chemochromic assembly to a second redox agent to change the oxidation state of the transition-metal dopant particles back to the original oxidation state prior to step (ii), wherein step (iii) does not change the oxidation state of any elements in the semiconductor nanoparticles.

Some embodiments provide a method to control a chemochromic article, the method comprising:

(i) providing a chemochromic assembly comprising:

semiconductor nanoparticles that have an average nanoparticle effective diameter from about 1 nanometer to about 20 nanometers;

transition-metal dopant particles disposed on surfaces of the semiconductor nanoparticles and/or within the semiconductor nanoparticles, wherein the transition-metal dopant particles are capable of undergoing reversible oxidation and reduction, and wherein the transition-metal dopant particles are present in an amount from about 0.001% to about 5% of the weight of the semiconductor nanoparticles; and a solid matrix surrounding the semiconductor nanoparticles or surrounding a solution containing the semiconductor nanoparticles;

(ii) exposing the chemochromic assembly to a first redox agent to change the oxidation state of the transition-metal dopant particles, wherein step (ii) does not change the oxidation state of any elements in the semiconductor nanoparticles;

(iii) optionally, exposing the chemochromic assembly to a second redox agent to change the oxidation state of the transition-metal dopant particles back to the original oxidation state prior to step (ii), wherein step (iii) does not change the oxidation state of any elements in the semiconductor nanoparticles.

All options, species types, species concentrations, and other selections, conditions, and parameters described above in reference to the chemochromic article are also applicable to a method to control the chemochromic article.

In some methods, the transition-metal dopant particles contain a transition metal selected from the group consisting of Cu, Fe, Ag, Eu, and combinations thereof. The transition metal may be in any oxidation state, and during reversible oxidation and reduction, is in at least two different oxidation states.

In some methods, the transition-metal dopant particles are present in an amount from about 0.1% to about 2% of the weight of the semiconductor nanoparticles. In various embodiments, the transition-metal dopant particles are present in an amount, based on the weight of the semiconductor nanoparticles, of about, at least about, or at most about 0.001%, 0.002%, 0.005%, 0.01%, 0.02%, 0.03%, 0.04%, 0.05%, 0.1%, 0.15%, 0.2%, 0.25%, 0.3%, 0.35%, 0.4%, 0.45%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, or 5.0%, including any intervening range.

In some methods, the redox-labile species is selected from the group consisting of $NaIO_3$, $KIO_3$, $[Fe(CN)_6]^{3-}$, p-benzoquinone, $Na_2S_2O_3$, $K_2S_2O_3$, $NaBH_4$, $LiAlH_4$, diisobutylaluminum hydride, benzoyl peroxide, dicumyl peroxide, $I_2$, $I_3^-$, and combinations thereof.

In some methods, a redox-labile species first undergoes an electrochemical conversion to the desired oxidation state and then performs oxidation/reduction of the nanoparticle dopant. In these methods, the redox-labile species is initially in a chemically unreactive (non-spontaneous) state, such that it does not automatically perform the oxidation/reduction of the nanoparticle dopant, until the redox-labile species has first changed to the desired, electrochemically reactive state.

In some methods, the semiconductor nanoparticles are attached to the positive electrode, to the negative electrode, or to both the positive and negative electrodes. To enhance attachment to the electrode(s), the semiconductor nanoparticles may be mixed with an electrode-binding agent selected from the group consisting of polyvinylidene difluoride (PVDF), carboxymethyl cellulose (CMC), polytetrafluoroethylene (PTFE), and combinations thereof.

In some methods, the positive electrode and the negative electrode each contain an electrode material independently selected from the group consisting of platinum, gold, glassy carbon, graphite, stainless steel, tungsten, indium tin oxide, and combinations thereof. A conductive additive, such as carbon black, may be added to the positive electrode and/or the negative electrode.

The electrolyte may include salts of any of transition metals, metalloids, alkali metals, or alkaline earth metals. For example, salts in the electrolyte may be salts of V, Ti, Cr, Co, Ni, Cu, Zn, Tb, W, Ag, Cd, Au, Al, Ga, Ge, As, Se, Sn, Sb, Te, Bi, Li, Na, K, Mg, Ca, or a combination thereof.

In some methods, the electrolyte is selected from the group consisting of $LiSO_4$, $Na_2SO_4$, $KSO_4$, $LiCO_3$, KCl, $LiClO_4$, $KNO_3$, $LiPF_6$, and combinations thereof. In some embodiments, the semiconductor nanoparticles are dissolved in the electrolyte.

In some methods, the electrochemical cell further includes an electrolyte solvent selected from the group consisting of water, dimethylformamide, dimethylsulfoxide, dimethyl carbonate, diethyl carbonate, propylene carbonate, ethylene carbonate, γ-butyrolactone, acetone, ethers, toluene, tetrahydrofuran, acetonitrile, and combinations thereof.

In some embodiments, the chemochromic system is characterized in that when the chemochromic system is in the on state, the chemochromic article allows less than 20% transmission of incident visible or infrared light with energy below the bandgap of the semiconductor nanoparticles. In various embodiments, in the on state, the percent transmission of incident visible or infrared light with energy below a bandgap of the semiconductor nanoparticles is about, or at most about, 20%, 15%, 10%, 9%, 8%, 7%, 6%, 5%, 4%, 3%, 2%, 1%, or 0%, including any intervening ranges. An energy below a bandgap of the semiconductor nanoparticles will depend on the specific nanoparticles employed. For example, in the case of the semiconductor nanoparticles being ZnSe, zinc selenide is known to have a bandgap of 2.70 eV. Light with at least this energy, which corresponds to a wavelength of 459 nm, will cause electrons in ZnSe to jump from the valence band to the conduction band. Thus, in this particular case, incident visible or infrared light with energy below the ZnSe bandgap will be light having a wavelength greater than 459 nm, such as light in the IR spectrum.

Photoexcitation of semiconductor nanoparticles takes place at a wavelength that initiates the photochromic absorption effect (darkening). A wavelength that initiates (triggers) darkening may be in the ultraviolet (UV) spectrum, which is 100 nm to 399 nm for purposes of this specification. Alternatively, or additionally, a wavelength that initiates (triggers) darkening may be in the visible spectrum, which is 400 nm to 750 nm for purposes of this specification. Alternatively, or additionally, a wavelength that initiates darkening may be in the infrared spectrum, which is 751 nm to 1 mm. A wavelength that initiates darkening may be in the near infrared (NIR) spectrum, which is 751 nm to 1400 nm. A wavelength that initiates darkening may be in the short-wavelength infrared (SWIR) spectrum, which is 1401 nm to 3000 nm. A wavelength that initiates darkening may be in the mid-wavelength infrared (MWIR) spectrum, which is 3001 nm to 8000 nm. A wavelength that initiates darkening may be in the long-wavelength infrared (LWIR) spectrum, which is 8001 nm to 15000 nm (15 μm). There may be multiple wavelengths (e.g., a range of wavelengths) that initiate darkening.

The wavelengths that trigger the photochromic darkening can be different than the absorbed wavelengths from the photochromic effect. A wavelength that is absorbed during darkening may be in the UV, visible NIR spectrum, SWIR, MWIR, and/or LWIR spectrum. There may be multiple wavelengths (e.g., a range of wavelengths) that are absorbed during darkening. In typical embodiments, the wavelength range that is absorbed during darkening is broader (wider) that the wavelength range that initially triggers the darkening. This feature results from the fact that the wavelength range that is absorbed to trigger darkening does not change when the particles darken, resulting in the darkened nanoparticle absorbing a broader range of wavelengths. For example, Zn absorbs at wavelengths shorter than 350 nm; when Zn darkens, there is also absorption in the 400-900 nm range of wavelengths. The undark Zn particle absorbs only at <350 nm; the darkened particle still absorbs at <350 nm and additionally absorbs at 400-900 nm.

Photoexcitation of doped semiconductor nanoparticles is generally very fast, if incoming light has an energy greater than the bandgap energy of the semiconductor nanoparticles. A typical timescale of the photoexcitation is about 100 picoseconds to about 10 nanoseconds.

In some embodiments, reversing photochromism takes place on a time scale of about 1 minute or less, such as about 30 seconds or less. This time scale may also be referred to as the relaxation time or the photochromic reversal time. The relaxation time is measured in the solid state (not in solution) and is calculated as the time to achieve 90% reduction in the maximum photochromic darkening that occurred. When multiple wavelengths are of interest, the photochromic reversal time may be a function of wavelength.

The chemochromic article may be in the form of a deposited film. To preserve the optical and aesthetic quality of the deposited film, transparent metal-oxide films may be utilized to generate a uniform field across the substrate to passivate the chemochromicity. Transparent conductive oxides may be $SnO_2$ doped with In or F. The transparent metal-oxide film may have high transmissivity (such as >80%), while retaining high carrier mobility. These films may be deposited via magnetron sputtering, chemical vapor deposition, epitaxial growth, solution deposition, spraying, or pulsed laser deposition, for example. Other doped oxides which may be used as films to induce the electric field and provide the on/off function may be doped binary compounds such as ZnO, with Al dopants or other transition-metal dopants such as Mo or Ta, which give access to higher electron-mobility and electron-conductivity regimes compared to $SnO_2$. Other wide-bandgap, correlated perovskite crystal structures such as $BaSnO_3$, $SrVO_3$, or $CaVO_3$ may be utilized for an electric field-generating bed as well. Outside of metallic or oxide-based materials, transparent conducting polymers such as poly(3,4-ethylenedioxythiophene), poly (styrene sulfonate), poly(4,4-dioctyl cyclopentadithiophene), or combinations thereof, have tunable conjugated double bonds that promote conduction and selective light absorption.

In some embodiments, the deposited film is patterned. Patterning may be accomplished via photolithographic and etching steps which enable highly specific, nanometer-scale, transparent wire geometries. Specified geometries of wires allow for field enhancement which funnels the electrical or electrochemical field more efficiently, in some embodiments employing an electrochemical cell, for example.

There are many uses for the disclosed chemochromic compositions and systems. The compositions or systems may be incorporated into lenses, windows, and sensors, for example.

Examples of window applications include windshields for vehicles, as well as windows for buildings. Windshield glare protection may be provided by self-darkening windows at a fraction of the cost of electrochromics. An example of a window application is observation windows for chemical reactors in which an operator needs to view inside a reactor that is carrying out a reaction releasing dangerous radiation, such as UV light.

Examples of sensor applications include UV sensors, visible-light sensors, IR sensors, and sensors that are configured to sense a property other than light but which may be impacted in performance by light—e.g., temperature sensors, pressure sensors, pH sensors, humidity sensors, CO sensors, $CO_2$ sensors, $CH_4$ sensors, ionizing-radiation sensors, magnetic sensors, and so on.

Other applications include, but are by no means limited to, switching polarizers, satellites, autonomous-vehicle cameras, solar-cell protection, and laser protection.

EXAMPLES

Example 1: Synthesis of Copper-Doped Zinc Sulfide Nanoparticles with 3-Mercaptopropionic Acid Ligands Chemical synthesis of Cu-doped ZnS nanocrystals is carried out as follows. In this example, ZnS is the semiconductor nanoparticle, copper is a transition-metal dopant particle, and 3-mercaptopropionic acid is a ligand.

$Zn(CH_3COO)_2 \cdot 2H_2O$(0.549 g, 2.5011 mmol) and $Cu(CH_7O_2)_2$ (0.007 g, 0.0253 mmol) are dissolved in deionized water (50 mL, 2774.7 mmol). Then, 3-mercaptopropionic acid (1.0 mL, 11.494 mmol) is added to the solution. The solution pH is adjusted to 10.3 using 2 M aqueous solution of NaOH. After sparging with Ar for 30 min, a 0.46 M aqueous solution of $Na_2S$ (2.5 mL, 1.1499 mmol) is injected into the solution under vigorous stirring at room temperature. The mixed solution is kept for 15 min under magnetic stirring while sparging, then heated to 100° C. for 24 hr to form nanocrystals. The obtained Cu-doped ZnS nanocrystals are precipitated by ethanol (solution:ethanol=4:1 vol:vol), and centrifuged at 4,000 revolutions per minute (rpm) for 5 min to form a precipitate. The precipitate is then dried in vacuum at 50° C.

Isolated Cu-doped ZnS nanocrystals are ground to a fine powder using a pestle and mortar. XRD analysis indicates an average crystallite size of 3.1 nm. The nanocrystals are suspended in water at a concentration of 100 mg/mL and all measurements and redox occurs in this solution.

The solutions are subsequently tested for chemochromism, as discussed in Example 2. The chemochromic control of darkening and subsequent ability to photodarken from exposure to a 365 nm source is shown in FIGS. 4 to 7, described in Example 2.

Example 2: Chemochromic Testing of Example 1 Film

Figure 4:
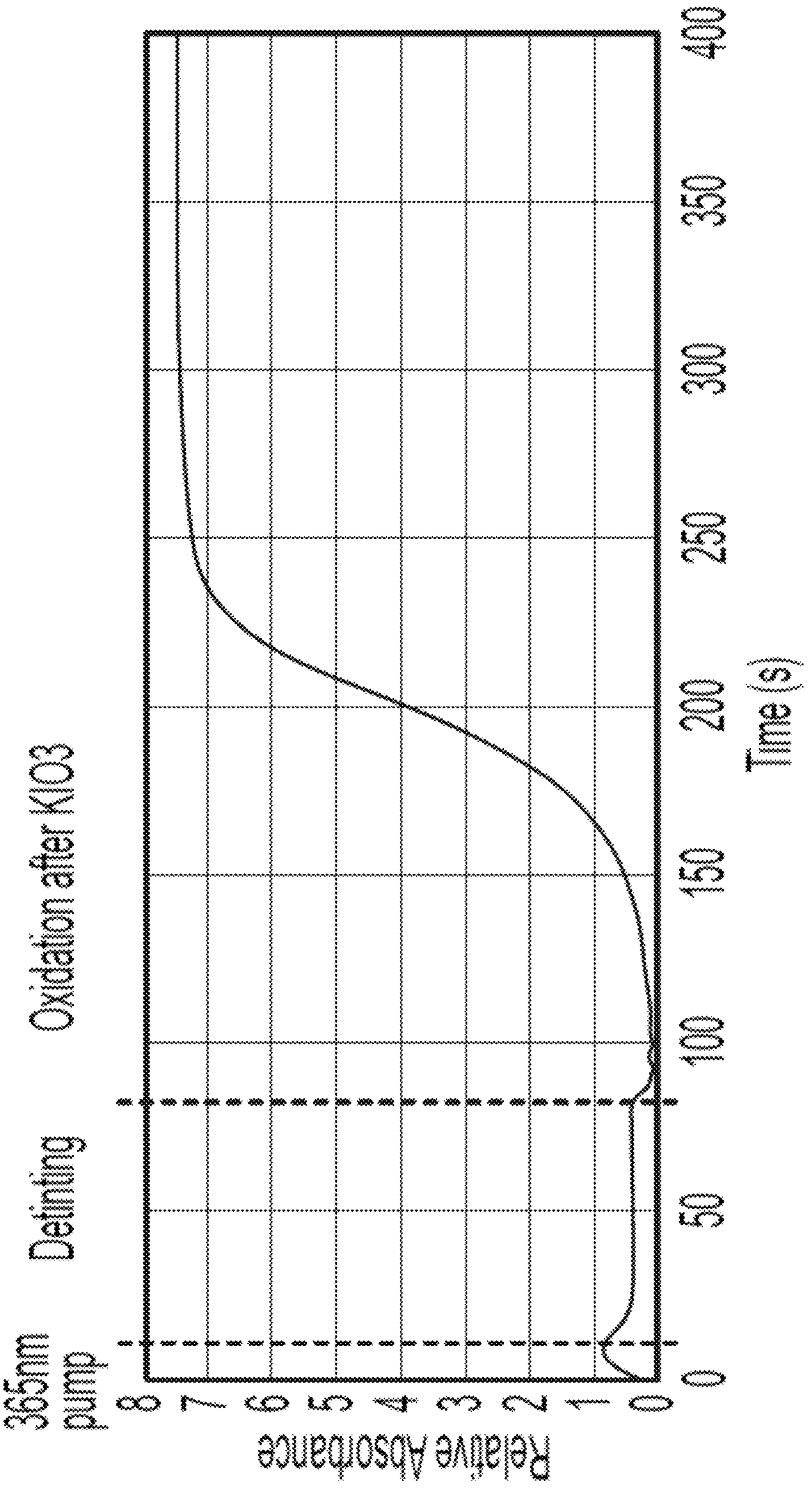
FIG. 4 shows chemochromic darkening of the Example 1 film, confirming copper oxidation by testing nanoparticle photochromic response before and after addition of $KIO_3$ oxidizing agent, in Example 2.

FIG. 4 shows chemochromic darkening of the Example 1 nanoparticles. Copper oxidation is confirmed by testing nanoparticle photochromic response before and after addition of the $KIO_3$ oxidizing agent. The nanoparticles are optically excited with a 365 nm pump for 10 seconds (first dashed line on left side of graph) while probing absorbance at 640 nm. The typical photochromic darkening and detinting curve is observed at the experiment start (0-50 seconds). After complete photochromic detinting, $KIO_3$ is added (second dashed line at about 80 seconds) to oxidize the Cu. A significant increase in absorbance is observed.

Figure 5:
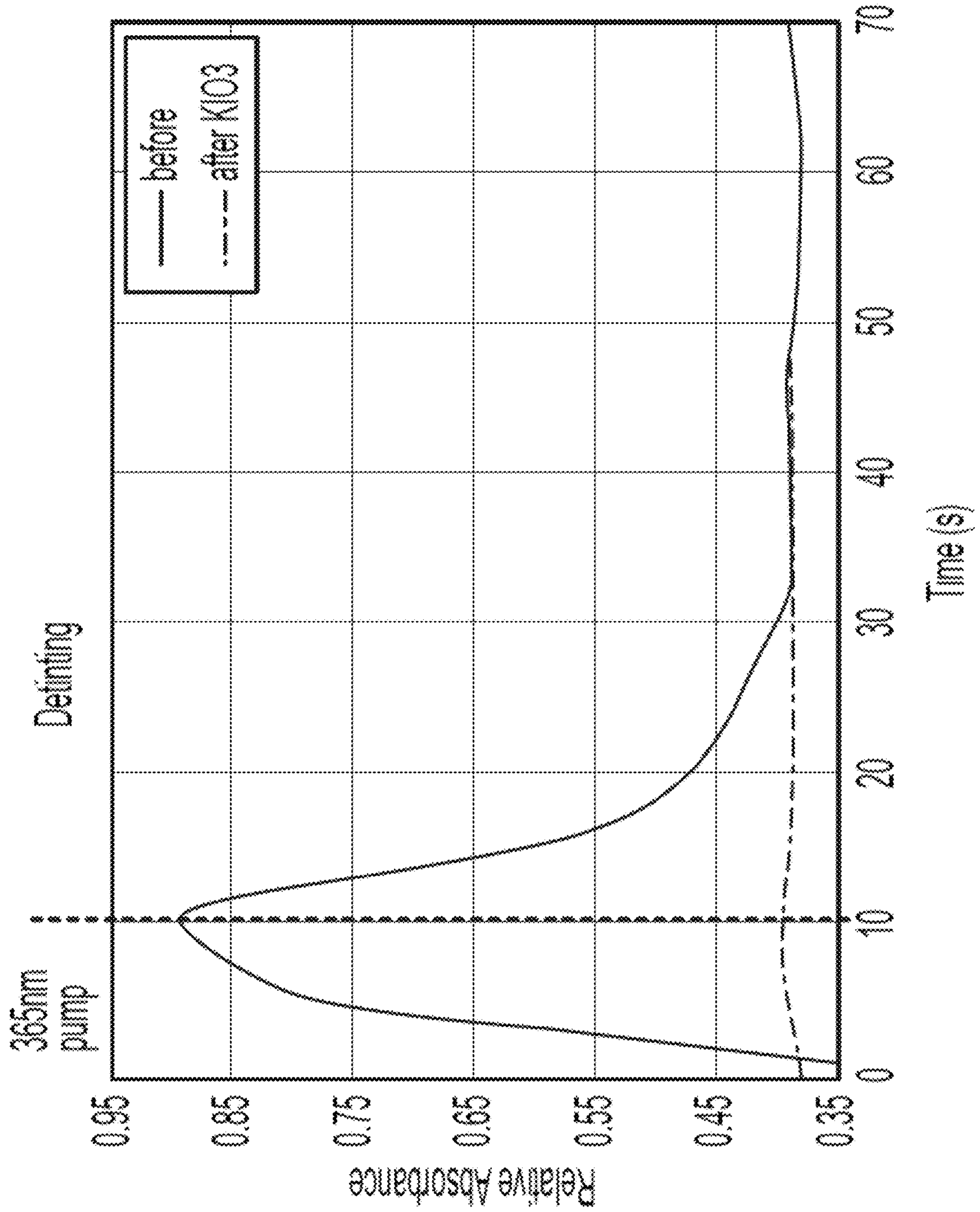
FIG. 5 overlays the nanoparticle photochromic response before and after chemical redox and darkening, confirming dopant oxidation, in Example 2.

FIG. 5 confirms the dopant oxidation of the Example 1 film. FIG. 5 overlays the nanoparticle photochromic response before and after chemical redox and darkening. The baseline is standardized for the overlay. The nanoparticles are optically excited with a 365 nm pump for 10 seconds (dashed line) while probing absorbance at 640 nm.

After chemical oxidation of the Cu dopant, the photochromic response turns off. Following stabilization of darkening, the measured photochromism shows very minimal tinting in FIG. 5, confirming Cu is oxidized.

Figure 6:
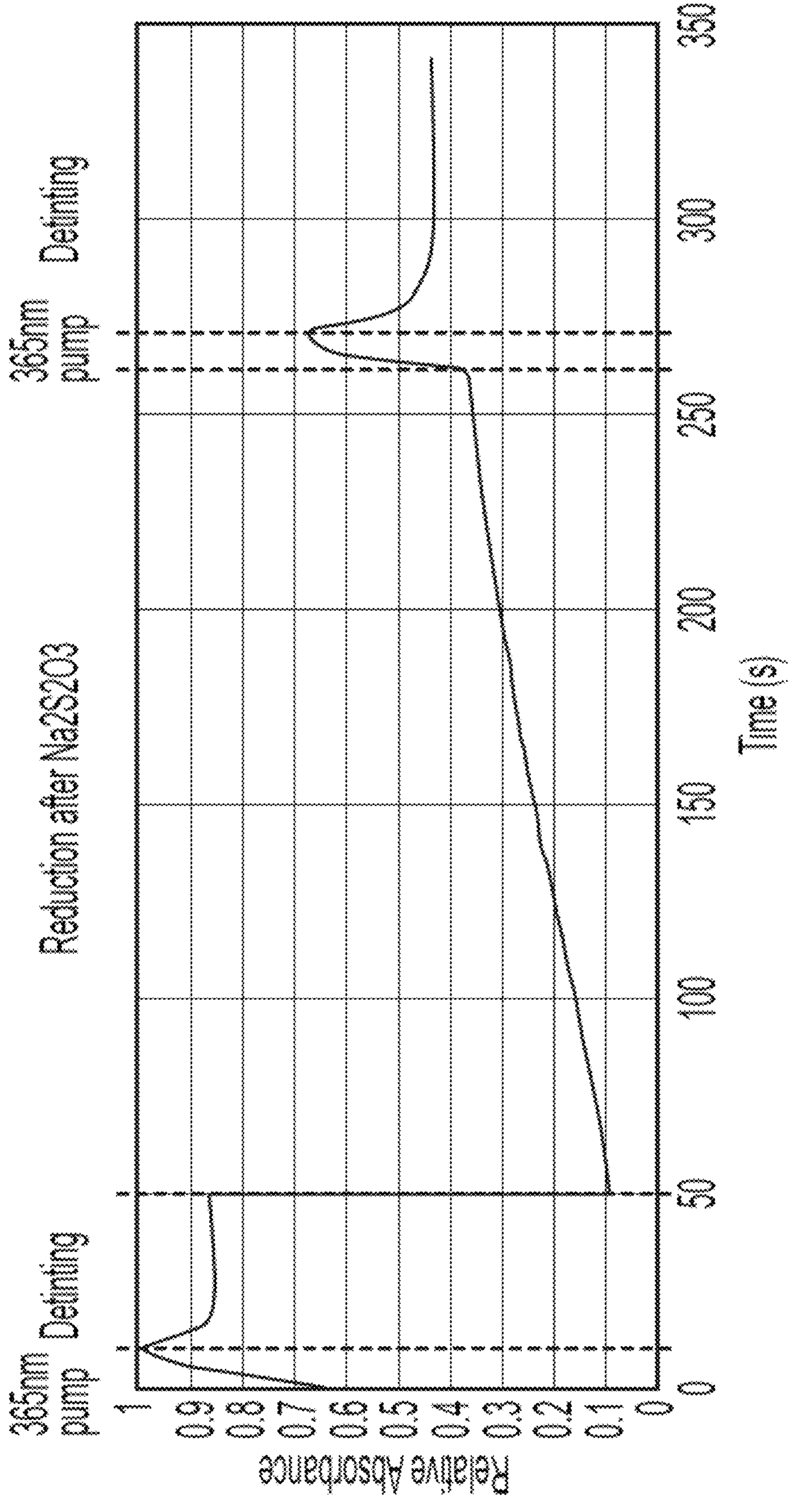
FIG. 6 shows chemochromic lightening of the Example 1 nanoparticles after $KIO_3$ oxidation, confirming redox reversal to reduced Cu by testing nanoparticle photochromic response before and after addition of a $Na_2S_2O_3$ reducing agent, in Example 2.

After confirming nanoparticle dopants are oxidized to the Cu(II) state, chemochromic reversibility is tested with subsequent additions of a reducing agent. Increasing photochromic response confirms Cu(II) conversion back to the Cu(I) state. FIG. 6 shows chemochromic lightening of the Example 1 film after $KIO_3$ oxidation. Redox reversal to the reduced Cu state is confirmed by testing nanoparticle photochromic response before and after addition of $Na_2S_2O_3$ reducing agent. The chemically oxidized nanoparticles are optically excited with a 365 nm pump for 10 seconds (first dashed line on left side of graph) while probing absorbance at 640 nm. Minimal photochromic darkening and detinting curve are observed (0-50 seconds). After complete photochromic detinting, $Na_2S_2O_3$ was added (after 50 seconds) to reduce the Cu, and a decrease in absorbance is observed. Slight darkening occurs during solution homogenization. Following stabilization of lightening, the photochromism is measured again (260-340 seconds) and stronger photochromic tinting is observed (overlay in FIG. 7), confirming Cu was reduced.

Figure 7:
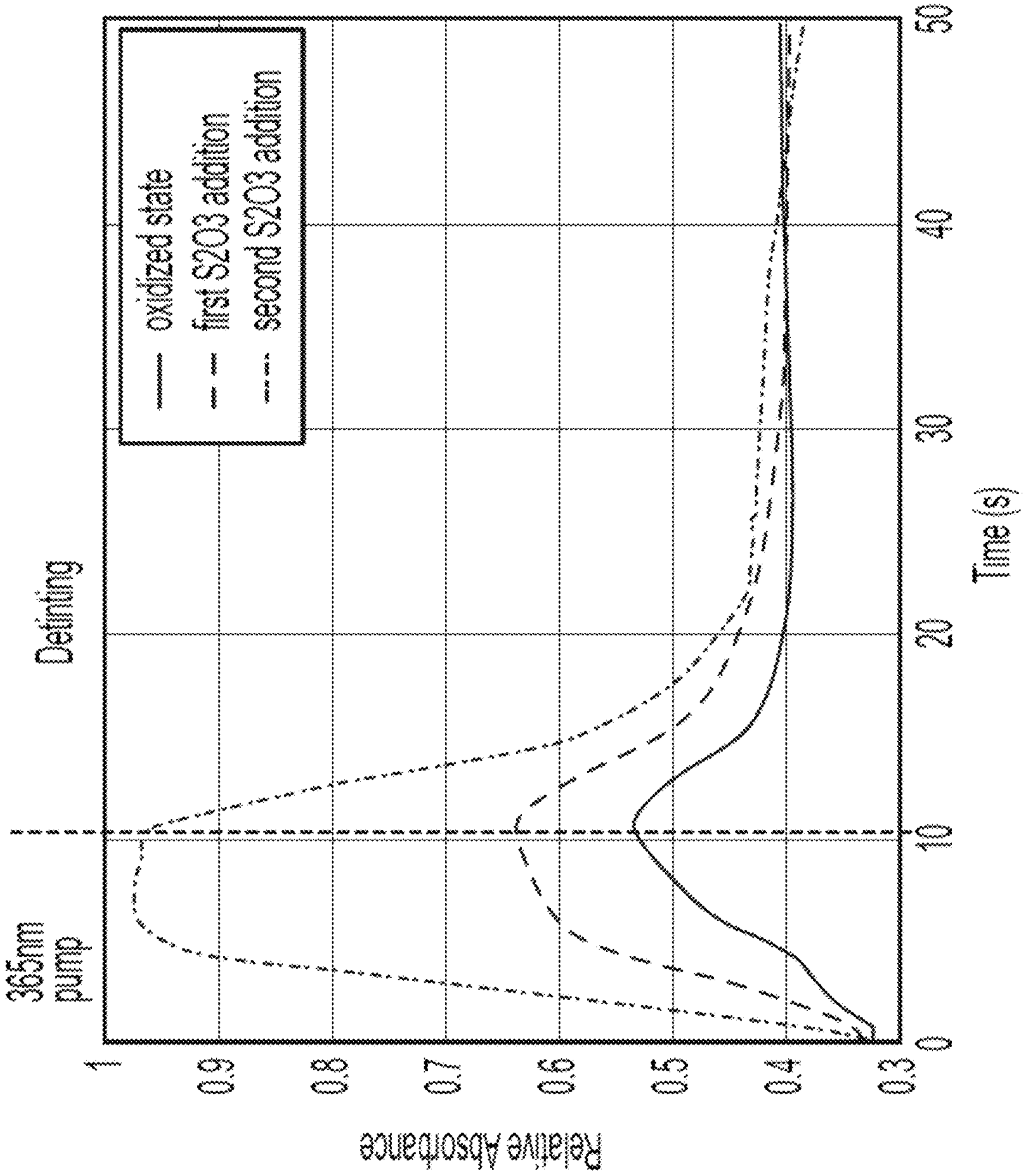
FIG. 7 overlays the nanoparticle photochromic response in the oxidized state (after $KIO_3$ oxidation) and after sequential additions of $Na_2S_2O_3$ reducing the Cu, confirming dopant reduction, in Example 2.

FIG. 7 confirms dopant reduction of the Example 1 film. FIG. 7 overlays the nanoparticle photochromic response in the oxidized state (after $KIO_3$ oxidation) and after sequential additions of $Na_2S_2O_3$ reducing the Cu. The baseline is standardized for the overlay. The nanoparticles are optically excited with a 365 nm pump for 10 seconds (dashed line) while probing absorbance at 640 nm. The return to the Cu(I) state turns back on the photochromic optical response. As more reducing agent is added, a greater tinting response is regained.

In this Example 2, copper-doped zinc sulfide displays chemochromism wherein visible (640 nm) darkening is observed after chemical oxidation of the Cu dopant with potassium iodate (FIGS. 4 and 5), causing a Cu(I)→Cu(II) conversion. The darkening effect is reversible upon addition of sodium thiosulfate to reduce the Cu(II) ($Cu^{2+}$) back to the original Cu(I) (Cu+) state (FIGS. 6 and 7). The resultant oxidation state of the Cu is also reflected in the nanoparticle photodarkening, because the dopant must be in the reduced state for a photochromic response to occur. The intensity of photochromic tinting is proportional to the ratio of Cu(I)/Cu(II) in the sample. These results are surprising, because doped zinc sulfide was not a previously known chemochromic material.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A chemochromic article comprising:

(a) semiconductor nanoparticles that have an average nanoparticle effective diameter from about 1 nanometer to about 20 nanometers;

(b) transition-metal dopant particles disposed on surfaces of said semiconductor nanoparticles and/or within said semiconductor nanoparticles, wherein said transition-metal dopant particles are capable of undergoing reversible oxidation and reduction, and wherein said transition-metal dopant particles are present in an amount from about 0.001% to about 5% of the weight of said semiconductor nanoparticles;

(c) a redox agent that is capable of changing an oxidation state of said transition-metal dopant particles; and (d) ligands bonded to said semiconductor nanoparticles, wherein said ligands contain a carboxylate functional group, a thiol functional group, an amine functional group, or a combination thereof.

2. The chemochromic article of claim 1, wherein said semiconductor nanoparticles are selected from the group consisting of single-element nanoparticles, two-element nanoparticles, three-element nanoparticles, four-element nanoparticles, and combinations thereof.

3. The chemochromic article of claim 2, wherein said single-element nanoparticles are selected from the group consisting of Si, Ge, and combinations thereof.

4. The chemochromic article of claim 2, wherein said two-element nanoparticles are selected from the group consisting of ZnS, ZnSe, ZnTe, CdS, CdSe, CdTe, PbS, PbSe, PbTe, InP, InAs, InSb, GaP, GaAs, $Ag_2S$, $Ag_2Se$, $Ag_2Te$, and combinations thereof.

5. The chemochromic article of claim 2, wherein said three-element nanoparticles are selected from the group consisting of $Zn_xCd_{1-x}S$, $Zn_xCd_{1-x}Se$, $Zn_xCd_{1-x}Te$, $Zn_xPb_{1-x}S$, $Zn_xPb_{1-x}Se$, $Zn_xPb_{1-x}Te$, $Zn_xSn_{1-x}S$, $Zn_xSn_{1-x}Se$, $Zn_xSn_{1-x}Te$, $Pb_xSn_{1-x}S$, $Pb_xSn_{1-x}Se$, $Pb_xSn_{1-x}Te$, $In_xGa_{1-x}P$, $In_xGa_{1-x}As$, $Ag_{2x}Cd_{1-x}S$, $Ag_{2x}Cd_{1-x}Se$, $Ag_{2x}Cd_{1-x}Te$, $Ag_{2x}Pb_{1-x}S$, $Ag_{2x}Pb_{1-x}Se$, $Ag_{2x}Pb_{1-x}Te$, $Ag_{2x}Sn_{1-x}S$, $Ag_{2x}Sn_{1-x}Se$, $Ag_{2x}Sn_{1-x}Te$, and combinations thereof, wherein $0<x<1$.

6. The chemochromic article of claim 2, wherein said four-element nanoparticles are selected from the group consisting of copper indium gallium selenide, copper zinc tin sulfide, and combinations thereof.

7. The chemochromic article of claim 1, wherein said transition-metal dopant particles contain a transition metal selected from the group consisting of Cu, Fe, Ag, Eu, and combinations thereof.

8. The chemochromic article of claim 1, wherein said redox agent is selected from the group consisting of $NaIO_3$, $KIO_3$, $[Fe(CN)_6]^{3-}$, p-benzoquinone, $Na_2S_2O_3$, $K_2S_2O_3$, $NaBH_4$, $LiAlH_4$, diisobutylaluminum hydride, benzoyl peroxide, dicumyl peroxide, iodine, triiodide, and combinations thereof.

9. The chemochromic article of claim 1, wherein said ligands contain said carboxylate functional group, and wherein said ligands are selected from the group consisting of 4-pentenoate, phenylacetate, 3-phenylpropionate, 4-phenylbutyrate, methacrylate, oleate, and combinations thereof.

10. The chemochromic article of claim 1, wherein said ligands contain said thiol functional group, and wherein said ligands are selected from the group consisting of 2-propene-1-thiol, benzenethiol, and combinations thereof.

11. The chemochromic article of claim 1, wherein said ligands contain said amine functional group, and wherein said ligands are selected from the group consisting of porphyrins, aniline, benzylamine, phenethylamine, phenylpropylamine, oleylamine, 2-aminoethanol, 3-aminopropanol, and combinations thereof.

12. The chemochromic article of claim 1, wherein said chemochromic article further comprises an ionic charge-compensating species contained within said semiconductor nanoparticles and/or contained on surfaces of said semiconductor nanoparticles.

13. The chemochromic article of claim 12, wherein said ionic charge-compensating species is selected from the group consisting of $Li^+$, $Na^+$, $K^+$, $Mg^{2+}$, $H^+$, and combinations thereof.

14. The chemochromic article of claim 1, wherein said chemochromic article is contained within an electrochemical cell.

15. An electrochemical cell for controlling a chemochromic assembly, said electrochemical cell comprising:

(A) a chemochromic assembly comprising:

semiconductor nanoparticles that have an average nanoparticle effective diameter from about 1 nanometer to about 20 nanometers;

transition-metal dopant particles disposed on surfaces of said semiconductor nanoparticles and/or within said semiconductor nanoparticles, wherein said transition-metal dopant particles are capable of undergoing reversible oxidation and reduction, and wherein said transition-metal dopant particles are present in an amount from about 0.001% to about 5% of the weight of said semiconductor nanoparticles; and ligands bonded to said semiconductor nanoparticles, wherein said ligands contain a carboxylate functional group, a thiol functional group, an amine functional group, or a combination thereof;

(B) one or more redox-labile species that are capable of changing an oxidation state of said transition-metal dopant particles;

(C) a positive electrode;

(D) a negative electrode; and (E) an electrolyte.

16. The electrochemical cell of claim 15, wherein said transition-metal dopant particles contain a transition metal selected from the group consisting of Cu, Fe, Ag, Eu, and combinations thereof.

17. The electrochemical cell of claim 15, wherein said redox-labile species is selected from the group consisting of $NaIO_3$, $KIO_3$, $[Fe(CN)_6]^{3-}$, p-benzoquinone, $Na_2S_2O_3$, $K_2S_2O_3$, $NaBH_4$, $LiAlH_4$, diisobutylaluminum hydride, benzoyl peroxide, dicumyl peroxide, iodine, triiodide, and combinations thereof.

18. The electrochemical cell of claim 15, wherein said semiconductor nanoparticles are attached to said positive electrode and/or said negative electrode.

19. The electrochemical cell of claim 18, wherein said semiconductor nanoparticles are mixed with an electrode-binding agent selected from the group consisting of PVDF, CMC, PTFE, and combinations thereof.

20. The electrochemical cell of claim 15, wherein said positive electrode and said negative electrode each contain an electrode material independently selected from the group consisting of platinum, gold, glassy carbon, graphite, stainless steel, tungsten, indium tin oxide, and combinations thereof.

21. The electrochemical cell of claim 15, wherein said electrolyte is selected from the group consisting of $LiSO_4$, $Na_2SO_4$, $KSO_4$, $LiCO_3$, KCl, $LiClO_4$, $KNO_3$, $LiPF_6$, and combinations thereof.

22. The electrochemical cell of claim 15, wherein said electrochemical cell further includes an electrolyte solvent selected from the group consisting of water, dimethylformamide, dimethylsulfoxide, dimethyl carbonate, diethyl carbonate, propylene carbonate, ethylene carbonate, γ-butyrolactone, acetone, ethers, toluene, tetrahydrofuran, acetonitrile, and combinations thereof.

* * * * *